United States Patent
Inoue

(10) Patent No.: US 8,023,537 B2
(45) Date of Patent: Sep. 20, 2011

(54) OPTICAL PULSE TRAIN GENERATOR

(75) Inventor: Takashi Inoue, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 350 days.

(21) Appl. No.: 12/240,546

(22) Filed: Sep. 29, 2008

(65) Prior Publication Data

US 2010/0284431 A1  Nov. 11, 2010

Related U.S. Application Data

(63) Continuation of application No. PCT/JP2007/056807, filed on Mar. 29, 2007.

(30) Foreign Application Priority Data

Mar. 29, 2006 (JP) ................... 2006-092392
Oct. 4, 2006 (JP) ................... 2006-273197

(51) Int. Cl.
  *H01S 3/10* (2006.01)
  *H01S 3/13* (2006.01)
(52) U.S. Cl. .......................... 372/25; 372/30
(58) Field of Classification Search .......... 372/25, 372/29.021, 30
  See application file for complete search history.

(56) References Cited

U.S. PATENT DOCUMENTS

2007/0280613 A1  12/2007  Inoue et al.

FOREIGN PATENT DOCUMENTS

EP  1 306 718 A1  5/2003
WO  WO 2005/091065 A1  9/2005

OTHER PUBLICATIONS

T. I noue, et al., "Generation of 160-GHz sub-picosecond in-phase pulse train from optical beat signal", Optical Fiber Communication Conference and Exposition National Fiber Optic Engineers Conference, OTuF7.pdf, OFCNFOEC 2007, XP031146747, Mar. 1, 2007, pp. 1-3.*

Y. Ozeki, et al., "Generation of 1 THz repetition rate, 97 fs optical pulse train based on comb-like profiled fibre", Electronics Letters, vol. 41, No. 19, Sep. 15, 2005, 2 Pages.

K. Igarashi, et al., "Comb-like profiled fibre for efficient generation of high quality 160 GHz sub-picosecond soliton train", Electronics Letters, vol. 41, No. 12, Jun. 9, 2005, 2 Pages.

Y Ozeki, et al., "Nearly Exact Optical Beat-to-Soliton Train Conversion Based on Comb-Like Profiled Fiber Emulating a Polynomial Dispersion Decreasing Profile", IEEE Photonics Technology Letters, vol. 17, No. 8, 2005, pp. 1698-1700.

(Continued)

*Primary Examiner* — Armando Rodriquez
(74) *Attorney, Agent, or Firm* — Oblon, Spivak, McClelland, Maier & Neustadt, L.L.P.

(57) ABSTRACT

An optical pulse train generator 10 includes beat light generation means 11 for generating a beat light 21 having a predetermined repeated frequency, a highly nonlinear fiber 12 for generating a pulse train 22 formed by adding a side mode to the beat light 21 by a four-wave mixing (FWM), and a band pass filter (BPF) 13 for adjusting a power balance of the side mode of the pulse train 22 so as to shape the frequency spectrum.

20 Claims, 29 Drawing Sheets

Beat light generation means
(for example, repetition frequency Δf=160 GHz)

OTHER PUBLICATIONS

E. M. Dianov, et al., "Generation of a train of fundamental solitons at a high repetition rate in optical fibers", Optics Letters, vol. 14, No. 18, Sep. 15, 1989, pp. 1008-1010.

S. V. Chernikov, et al., "1-THZ optical pulse train generation at 1.5μm", Cleo' 94, CTuH3, 1994, p. 73.

Joáo F.L. Freitas, et al., "Simultaneous generation and wavelength conversion of a pulse train from multi-wave mixing in an optical fibre", ScienceDirect, optics communications, vol. 269, No. 1, XP005770992, Nov. 16, 2006, pp. 94-97.

T. Inoue, et al., "Generation of 160-GHz sub-picosecond in-phase pulse train from optical beat signal", Optical Fiber Communication Conference and Exposition National Fiber Optic Engineers Conference, OTuF7.pdf, OFCNFOEC 2007, XP031146747, Mar. 1, 2007, pp. 1-3.

* cited by examiner

OPTICAL PULSE TRAIN GENERATOR

TECHNICAL FIELD

The Present invention relates to an optical pulse train generator that generates an ultrashort pulse train having a high repetition frequency, and more particularly to a generator for an in-phase optical pulse train that has a symmetrical frequency spectrum in a central frequency and has a line spectrum component present in the central frequency.

BACKGROUND ART

To realize an ultrahigh-speed and high-capacity optical transmission system, development of a technology that can realize a high repetition/ultrashort pulse train with a high quality has been strongly demanded. In regard to a repetition frequency, development of an optical pulse light source of 100 GHz or above exceeding a limit of electrical control has been already advanced, and a development result of an optical pulse light source of 1 tera Hz (THz) order has been reported in recent years. By way of example, conventional technologies disclosed in Non-patent Literatures 1 to 4 will be explained below.

In Non-patent Literature 1, there is reported a technology that generates a beat light obtained by combining lights subjected to sinusoidal modulation, e.g., two continuous lights having the same power and different frequencies and performs adiabatic compression by using an optical fiber to produce a high repetition optical pulse train having a high quality.

Further, In Non-patent Literature 2, there is reported a technology that generates an optical pulse train having a repetition frequency 125 GHz by using the method disclosed in Non-patent Literature 1 and repeating OTDM with respect to the obtained optical pulse train three times to generate an optical pulse train of 1 THz having an eightfold repetition frequency.

Furthermore, in Non-patent Literature 3, there is reported a technology that compresses a beat light having a repetition frequency of 160 GHz by using a comb-like profiled fiber (CPF) to generate a sub-picosecond optical pulse train. The CPF used in this technology is formed by alternately combining a highly nonlinear fiber (HNLF) and a single-mode fiber (SMF).

Moreover, in Non-patent Literature 4, there is reported a technology that compresses a beat light having a repetition frequency of 1 THz by using the same CPF as that in Non-patent Literature 3 to generate an optical pulse train having a pulse width of 100 femtoseconds.

As can be seen in Non-patent Literatures 1 to 4, it can be considered that utilizing the beat light as a seed pulse that is required to generate a high repetition optical pulse train exceeding 100 GHz is effective. The beat light can be generated by combining, e.g., continuous lights output from two DFB-LDs (distributed feedback laser diodes) having different oscillating frequencies.

Since the repetition frequency of the beat light is equal to a frequency difference of the two continuous lights to be combined, adjusting this frequency difference facilitates generating a beat light having a repetition frequency exceeding 100 GHz and enables producing a beat light having a repetition frequency of 1 THz.

Non-patent Literature 1: E. M. Dianov et al., "Generation of a train of fundamental solitons at a high repetition rate in optical fibers", Opt. Lett., vol. 14, p. 1008 (1989).

Non-patent Literature 2: S. V. Chernikov et al., "1-THz optical pulse train generation at 1.5 µm" CLEO '94, CTuH3, p. 73 (1994).

Non-patent Literature 3: K. Igarashi et al., "Comb-like profiled fiber for efficient generation of high quality 160 GHz sub-picosecond soliton train", Electron. Lett., vol, p. 688 (2005).

Non-patent Literature 4: Y. Ozeki et al., "Generation of 1 THz repetition rate, 97 fs optical pulse train based on comb-like profiled fiber", Electron. Lett., vol. 41, p. 1048 (2005).

DISCLOSURE OF INVENTION

Problem to be Solved by the Invention

However, the conventional optical pulse train generator has the following problems. According to the conventional method for compressing a beat light to generate an optical pulse train, an optical pulse train to be obtained becomes an out-of-phase optical pulse train in which phases are $\pi$[rad] shifted between adjacent pulses. FIG. 32 shows an example of an optical pulse train obtained by compressing a beat light.

In FIG. 32, a beat light obtained by combining two continuous lights having the same power contains spectral components of frequencies f1 and f2 having a predetermined frequency difference as seen from a frequency axis shown on an upper side in FIG. 32(a). Although a relative phase difference with respect to a reference continuous light must be defined to argue about a phase change in a light wave, there is shown a state where phases of peaks adjacent to each other are changed by $\pi$[rad], i.e., a positive sign and a negative sign of amplitudes are inverted as seen from a time axes showing the beat light on a lower side in FIG. 32(a) with a central frequency f0=(f1+f2)/2 of the beat light being determined as a reference light.

When the beat light shown in FIG. 32(a) is subjected to pulse compression by using, e.g., an optical fiber, such a light pulse train as shown in FIG. 32(b) can be obtained. That is, as seen from a frequency axis depicted on an upper side in FIG. 32(b), spectral components of a plurality of side modes are contained with the frequencies f1 and f2 at the center. Further, as seen from a time axis showing the obtained optical pulse train on a lower side in FIG. 32(b) with a central frequency f0=(f1+f2)/2 being determined as a reference light, an out-of-phase pulse train in which phases of pulses adjacent to each other are $\pi$[rad] changed is provided.

A definition of a phase difference between pulses adjacent to each other in an optical pulse train will now be strictly explained. In a frequency spectrum of an optical pulse train having a repetition frequency of $\Delta f$, line spectral components are arranged on a frequency axis at intervals of $\Delta f$. A frequency f0 of a reference light that is required to compare phases may be arbitrarily determined, and line spectral components that have frequencies of f1 and f1+$\Delta f$ and are adjacent to each other can be selected so as to achieve a relationship of f1≦f0<f1+$\Delta f$. At this time, $\Delta \phi$ given based on an expression $\Delta \phi = (f0 - f1) \times 2\pi / \Delta f$ is a phase difference between pulses adjacent to each other.

That is, the phase difference between pulses adjacent to each other is determined based on the frequency f0 of the arbitrarily determined reference light. $\Delta \phi = 0$ is attained, i.e., an "in-phase pulse train" having no phase difference between pulses adjacent to each other is provided when f0=f1 is achieved, i.e., when a line spectral component is present in the frequency f0, and $\Delta \phi = \pi$ is attained, i.e., an "out-of-phase pulse train" having a phase difference it between pulses adjacent to each other is provided when f0=f1+$\Delta f/2$, i.e., when the frequency f0 is an intermediate frequency of respective frequencies of two line spectral components adjacent to each other.

On the other hand, the spectrum of an optical pulse train is usually symmetrical on a frequency axis, and a frequency corresponding to this symmetrical axis is defined as a central frequency or a carrier frequency f0 and a light having this frequency is determined as a reference light to argue about a phase difference between pulses adjacent to each other in the optical pulse train in many cases.

In fact, the spectrum of an optical pulse train obtained when periodic intensity modulation involving no phase change is applied to a continuous light having a frequency f0 is symmetrical with the central frequency f0. At this time, whether a line spectral component is present in the frequency f0 is dependent on a method of intensity modulation. A line spectral component is present in the frequency f0 in case of a modulation scheme that is known as an RZ (Return-to-Zero) pulse modulation scheme, and a line spectral component is not present in the frequency f0 in case of a scheme that is known as a CS-RZ (Carrier Suppressed Return-to-Zero) pulse modulation scheme.

Generally, an in-phase pulse train is a pulse train that has symmetrical spectrums as shown in FIG. 2(d), a frequency f0 corresponding to a symmetrical axis as a central frequency, and a line spectral component present in f0.

In case of the spectrums shown in FIG. 32(a) or (b), since $\Delta f = f2 - f1$ is achieved and a central frequency is $f0 = (f1+f2)/2 = f1 + \Delta f/2$ as a general rule, $\Delta\phi = \pi$ can be attained based on the above expression, i.e., an out-of-phase pulse train can be provided.

It is known that the in-phase pulse train and the out-of-phase pulse train have different transmission characteristics when information is added by modulation and then transmitted, and both the strings are separately used. When a beat light is compressed to obtain an optical pulse train, there is an advantage that a repetition frequency can be greatly increased, and enabling generation of the respective in-phase and out-of-phase pulse trains is desirable. However, generation of the out-of-phase pulse train along has been reported, and a method enabling generation of the in-phase pulse train is not known.

In order to solve these problems, it is therefore an object of the present invention to provide a generally utilized optical pulse train generator that generates an in-phase pulse train by using a beat light as a seed light source.

Means for Solving Problem

According to a first aspect of an optical pulse train generator of the present invention, there is provided an optical pulse train generator comprising: beat light generation means for combining two continuous lights having a frequency difference corresponding to a predetermined repetition frequency to generate a beat light having the predetermined repetition frequency; side mode generation means for generating a side mode with respect to the beat light based on a nonlinear effect; and spectrum shaping means for adjusting a power ratio of the side mode generated by the side mode generation means and the beat light, wherein an in-phase pulse train is generated.

According to a second aspect, there is provided the optical pulse train generation characterized in that the beat light generation means generates an unbalanced beat light by providing a difference between powers of the two continuous lights and combining the continuous lights.

According to a third aspect, there is provided the optical pulse train generator characterized in that a ratio of amplitudes of the two continuous lights is set to fall within the range of 0.82 to 0.88.

According to a fourth aspect, there is provided the optical pulse train generator characterized in that the beat light generation means includes: two laser oscillators that output laser beams having a frequency difference corresponding to the repetition frequency; a 3-dB coupler that combines the two laser beams to output the beat light; a first optical amplifier that amplifies the beat light; and a first band pass filter that suppresses ASE (Amplified Spontaneous Emission) noise generated in the first optical amplifier.

According to a fifth aspect, there is provided the optical pulse train generator characterized in that the side mode generation means is a four-wave mixing in an optical fiber.

According to a sixth aspect, there is provided the optical pulse train generator characterized in that the optical fiber is a highly nonlinear fiber.

According to a seventh aspect, there is provided the optical pulse train generator characterized in that two or more fibers are connected with each other in the optical fiber and an isolator is interposed between the fibers connected with each other.

According to an eighth aspect, there is provided the optical pulse train generator characterized in that the spectrum shaping means is a second band pass filter.

According to a ninth aspect, there is provided the optical pulse train generator characterized in that the second band pass filter has a central frequency that is different from a central frequency of an input optical pulse train by a predetermined width.

According to a 10th aspect, there is provided the optical pulse train generator characterized by further comprising an anomalous dispersion medium on an outlet side of the band pass filter, the anomalous dispersion medium performing chirp compensation with respect to the optical pulse train having the shaped frequency spectrum.

According to an 11th aspect, there is provided the optical pulse train generator characterized in that the anomalous dispersion medium is a single-mode fiber.

According to a 12th aspect, there is provided the optical pulse train generator characterized by further comprising an optical pulse compressor on an outlet side of the anomalous dispersion medium.

According to a 13th aspect, there is provided the optical pulse train generator characterized in that the optical pulse compressor is configured by alternately connecting a nonlinear medium and the anomalous dispersion medium.

According to a 14th aspect, there is provided the optical pulse train generator characterized by further comprising an isolator at any one or more positions between the nonlinear medium and the anomalous dispersion medium.

According to a 15th aspect, there is provided the optical pulse train generator characterized by comprising a second optical amplifier and a third band pass filter between the anomalous dispersion medium and the optical pulse compressor.

According to a 16th aspect, there is provided the optical pulse train generator characterized by comprising a filter that allows line spectral components alone of the optical pulse train to be transmitted therethrough at any one or more positions on an outlet side of the 3-dB coupler or/and a downstream side of the 3-dB coupler.

According to a 17th aspect, there is provided the optical pulse train generator characterized in that the filter is a Fabry-Perot filter.

According to an 18th aspect, there is provided the optical pulse train generator characterized by further comprising optical time-division multiplexers whose quantity is determined based on the repetition frequency of the beat light and a required repetition frequency on the outlet side of the anomalous dispersion medium.

According to a 19th aspect, there is provided the optical pulse train generator characterized in that the optical pulse compressor is further provided between the anomalous dispersion medium and the optical time-division multiplexers.

According to a 20th aspect, there is provided the optical pulse train generator characterized in that a central frequency of the pulse train is even-fold of the repetition frequency.

Effect of the Invention

As explained above, according to the present invention, it is possible to provide the generally extensively utilized optical pulse train generator that generates an in-phase pulse train with a beat light used as a seed light source. The in-phase pulse train generated by the optical pulse train generator according to the present invention is an optical pulse train having spectrums symmetrical at an arbitrary frequency, containing a carrier frequency component, and substantially corresponding to a Fourier transformation limit, i.e., an optical pulse train in a state where phases are uniform without frequency chirp. According to the optical pulse train generator of the present invention, it is possible to generate an in-phase optical pulse train having a high repetition frequency exceeding 100 GHz to reach 1 THz.

EXPLANATIONS OF LETTERS OR NUMERALS

Figure 1:
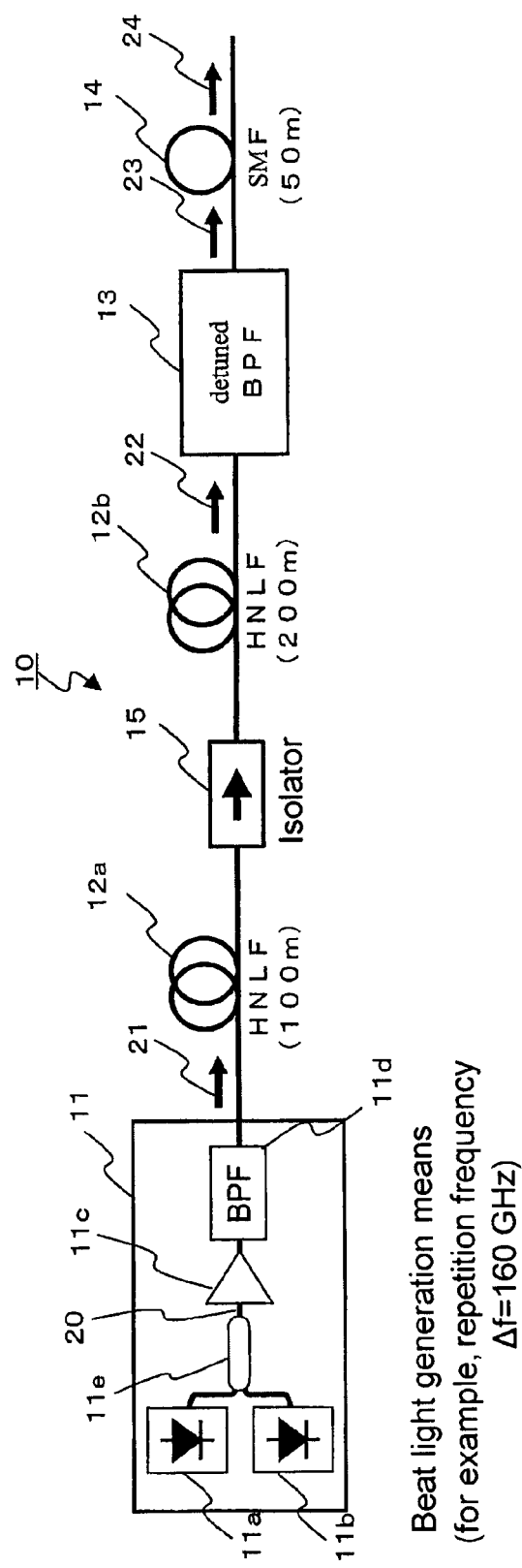
FIG. 1 is block diagram showing a structure of an optical pulse train generator according to a first embodiment of the present invention.

10 . . . optical pulse train generator
11 . . . beat light generation means
12 . . . highly nonlinear fiber
13 . . . band pass filter (BPF)
14 . . . single-mode fiber (SMF)
15 . . . isolator
21 . . . beat light
22, 23, 24, 25, 26, 43, 44 . . . pulse train
31 . . . EDFA
32 . . . BPF
33 . . . CPF
34 . . . VOA
41 . . . CPF pulse compressor
42 . . . time-division multiplexer

BEST MODE(S) FOR CARRYING OUT THE INVENTION

A structure of an optical pulse train generator according to a preferred embodiment of the present invention will now be explained hereinafter in detail with reference to the drawings. It is to be noted that like reference numerals denote respective constituent parts having like functions to simplify illustrations and explanations.

FIG. 1 is a block diagram showing a structure of an optical pulse train generator according to a first embodiment of the present invention. An optical pulse train generator 10 according to this embodiment includes beat light generation means 11 for generating a beat light 21 having a predetermined repetition frequency, a highly nonlinear fiber 12 that generates a new side mode of the beat light 21 based on a four-wave mixing (FWM) to generate an optical pulse train 22, and a band pass filter (BPF) 13 that adjusts a power balance of the side mode of the optical pulse train 22 to shape a frequency spectrum.

The beat light generation means 11 is configured to include at least two DFB-LDs (distributed feedback laser diodes) 11a and 11b and a 3-dB coupler 11e. Two continuous lights having a predetermined frequency difference $\Delta f$ are output from the DFB-LDs 11a and 11b and combined with each other by the 3-dB coupler 11e, thereby generating a beat light 20 having a repetition frequency equal to the frequency difference of the two continuous lights. One of frequencies of the two continuous lights is determined as f0 whilst the other frequency is determined as f0+$\Delta$, and a light having the frequency f0 is called a main mode whilst a light having the frequency f0+$\Delta f$ is called a side mode.

This embodiment is configured to further include an erbium doped fiber amplifier (EDFA) 11c and a BPF 11d, and the beat light 20 is amplified by the EDFA 11c and then ASE (amplified spontaneous emission) noise is suppressed by the BPF 11d.

In this embodiment, the highly nonlinear fiber 12 is divided into two pieces 12a and 12b, and an isolator 15 is provided between them. The isolator 15 is interposed between the highly nonlinear fibers 12a and 12b for the purpose of suppression of SBS (stimulated Brillouin scattering) that occurs in the highly nonlinear fiber 12.

A central frequency of the BPF 13 is different from a frequency f0 of a main mode of the optical pulse train 22 on an input side. Adjusting a difference (detuning) of the central frequency of the BPF 13 from f0 enables adjusting a power ratio of the side mode. In the example depicted in FIG. 1, a detuning amount is determined in such a manner that powers of side modes on both sides of the main mode become equal to each other.

The optical pulse train generator 10 according to this embodiment further includes a single-mode fiber (SMF) 14 on an outlet side of the BPF 13 in addition to the above-explained structure. An optical pulse train 23 shaped by the BPF 13 is in a state called "up-chirp" where an instantaneous frequency increases with time. The SMF 14 is added to perform chirp compensation with respect to this chirp based on an anomalous dispersion effect. A length of the SMF 14 is adjusted in such a manner that a pulse width of an optical pulse train 24 obtained after transmitted through the SMF 14 becomes minimum.

Figure 2:
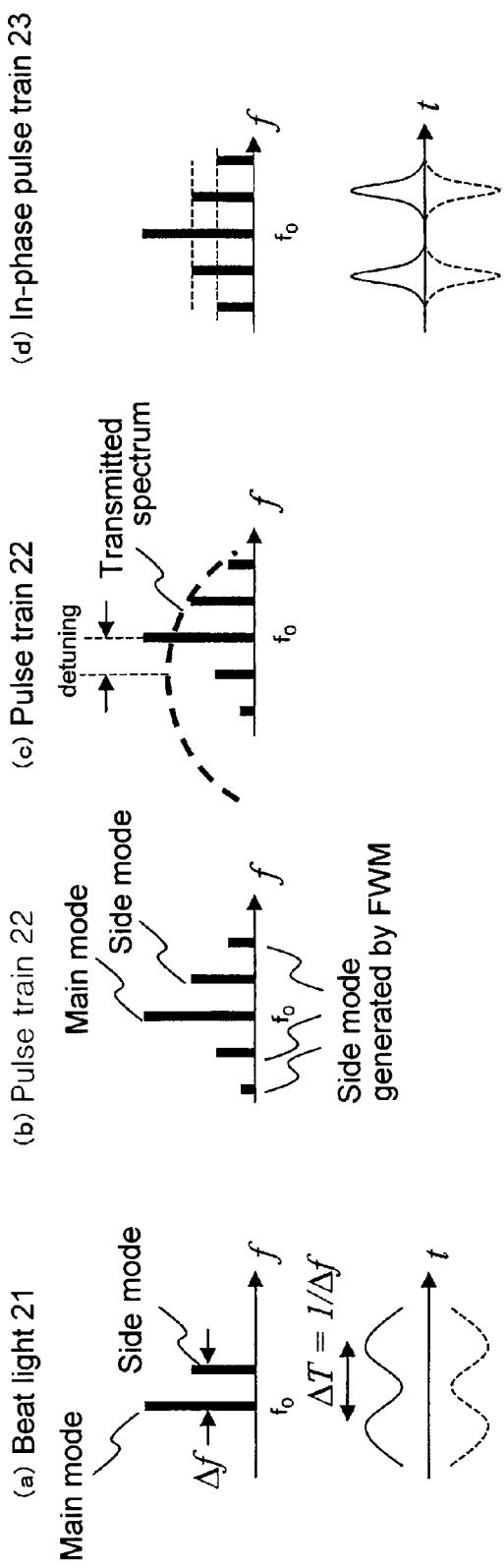
FIG. 2 is schematic views showing a process of generating an in-phase optical pulse train by using the optical pulse train generator according to the present invention.

A process of generating an in-phase optical pulse train by using the optical pulse train generator 10 having the above-described structure will now be explained with reference to FIG. 2. FIG. 2 is views schematically showing a process of generating an in-phase optical pulse train in the optical pulse train generator 10.

A waveform depicted in FIG. 2(a) indicates the beat light 21 generated by the beat light generation means 11, and an upper side shows the spectrum in the frequency domain whilst a lower side shows the temporal waveform. Here, it is assumed that the beat light 21 is generated from a first continuous light (a main mode) having a frequency f0 and a second continuous light (a side mode) having a central frequency f0+$\Delta f$ and a power smaller than that of the first continuous light. That is, the unbalanced beat light 21 is generated by combining the two continuous lights having the different powers. Since a waveform of the unbalanced beat light as seen from the time axis is as shown on the lower side of FIG. 2(a) and a time interval $\Delta T$ between peak amplitudes takes an inverse number of $\Delta f$, $\Delta f$ is a repetition frequency. It is to be noted that the beat light 21 is the unbalanced beat light in order to increase efficiency for production of side modes based on the FWM in the highly nonlinear fiber 12 as will be explained later.

FIG. 2(b) shows the spectrum of the optical pulse train 22 having side modes of the beat light 21 produced based on a four-wave mixing (FWM) in the highly nonlinear fiber 12. As shown in the drawing, the plurality of side modes are generated based on the FWM in the highly nonlinear fiber 12.

Respective spectral components of the side modes produced at symmetrical positions with the central frequency f0 have different powers, and hence each pulse waveform of the optical pulse train 22 is a distorted waveform. Thus, the band pass filter (BPF) 13 is used to shape the pulse waveforms of the optical pulse train 22.

As the BPF 13, a BPF having a central frequency that is different from the frequency f0 of the main mode of the optical pulse train 22 by a predetermined width (detuning) is used. Using the BPF 13 having the central frequency different from f0 by the predetermined width in this manner enables suppressing the side modes having higher powers as shown in FIG. 2(c), thereby generating the in-phase optical pulse train 23 having the side modes with balanced powers.

In the schematic views depicted in FIG. 2, the beat light 21 is an unbalanced beat light generated by combining the two continuous lights having different powers, but two continuous lights having the same power may be combined to generate the beat light 21. Even in this case, adjusting the central frequency of the BPF 13 enables generating such an in-phase pulse train 23 having the balanced powers as shown in FIG.

2(d). Alternatively, after two continuous lights having the same power may be combined to generate a beat light, a power ratio of the two continuous lights may be adjusted by using, e.g., the BPF, and then the beat light may be input to the highly nonlinear fiber 12 as FWM generation means.

A relationship between a ratio A of amplitudes of the respective two continuous lights constituting the beat light and a side mode generation efficiency based on the FWM will now be explained. It is assumed that a complex envelope amplitude of an electric field is q(z, t), and z and t are a distance in a fiber longitudinal direction and a time. As an initial waveform of the complex envelope amplitude, an unbalanced beat light having the spectrum depicted in FIG. 3 will be considered. The initial waveform of the complex envelope amplitude is represented by the following Equation 1.

[Equation 1]

$$q_0(t) = q(z=0, t) = \sqrt{P}(1 + A e^{i\Delta\omega t}) \quad \text{(Equation 1)}$$

Figure 3:
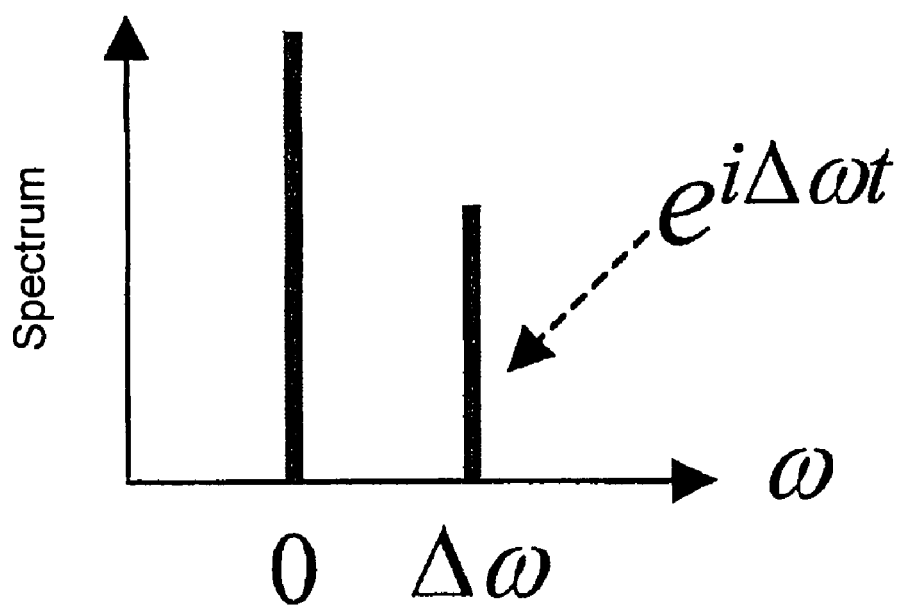
FIG. 3 is a view showing a spectral example of an unbalanced beat light.

Here, it is assumed that a frequency of a main mode is 0 and a frequency of a side mode is $\Delta\omega$. A denotes an amplitude ratio of both the modes, and A=1 represents a beat light that both the modes have the same amplitude and the same power. FIG. 3 specifically shows a state of the unbalanced beat light when A<1. It is to be noted that $\Delta\omega = 2\pi\Delta f$ is achieved and P denotes a power. Since an average power of $q_0(t)$ is Pave=P$(1+A^2)$, P can be represented by the following Equation (2) using $P_{ave}$ and A.

[Equation 2]

$$P = \frac{P_{ave}}{1 + A^2} \quad \text{(Equation 2)}$$

When this unbalanced beat light is propagated through the fiber, a consideration will be given as to a case where this light is affected by a nonlinear effect alone. Calculating development of the complex envelope amplitude with respect to the distance in the fiber longitudinal direction based on a propagation expression represented by the following Equation 3, the following Equation 4 can be provided.

[Equation 3]

$$i\frac{\partial q}{\partial z} + \gamma |q|^2 q = 0 \quad \text{(Equation 3)}$$

[Equation 4]

$$q(z, t) = \sqrt{P}(1 + A e^{i\Delta\omega t}) e^{i\gamma P(1+A^2)} e^{ix\cos\Delta\omega t} \quad \text{(Equation 4)}$$

In this equation, $\gamma$ is a nonlinear coefficient of the fiber and x is a variable defined by the following Equations 5 and 6.

[Equation 5]

$$x = 2\gamma P A z = \frac{2A}{1+A^2} \varphi_{NL} \quad \text{(Equation 5)}$$

[Equation 6]

$$\varphi_{NL} = \gamma P_{ave} z \quad \text{(Equation 6)}$$

Figure 4:
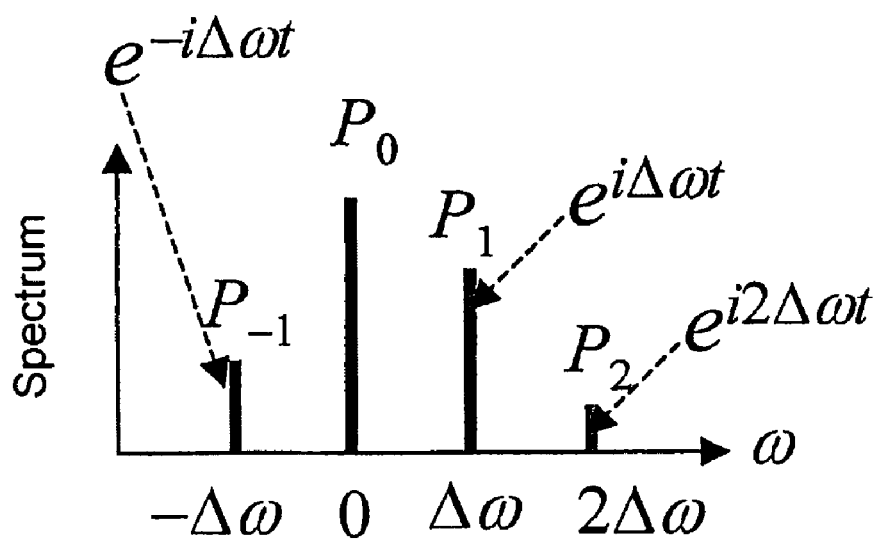
FIG. 4 is a view showing spectrums generated in side modes by an FWM in a fiber.

This result describes a state of the side mode produced by the FWM in the fiber, and FIG. 4 shows spectrums. Calculating a power $P_n$ of exp[in$\Delta\omega$t] of each of the main mode and the respective side modes, it can be obtained as, e.g., Equation (10) from the following Equation (7).

[Equation 7]

$$P_0 = P_{ave} \frac{J_0^2(x) + A^2 J_1^2(x)}{1 + A^2} \quad \text{(Equation 7)}$$

[Equation 8]

$$P_1 = P_{ave} \frac{A^2 J_0^2(x) + J_1^2(x)}{1 + A^2} \quad \text{(Equation 8)}$$

[Equation 9]

$$P_{-1} = P_{ave} \frac{J_1^2(x) + A^2 J_2^2(x)}{1 + A^2} \quad \text{(Equation 9)}$$

[Equation 10]

$$P_2 = P_{ave} \frac{A^2 J_1^2(x) + J_2^2(x)}{1 + A^2} \quad \text{(Equation 10)}$$

In this equation, n=0 corresponds to an occasion of the main mode.

Figure 5:
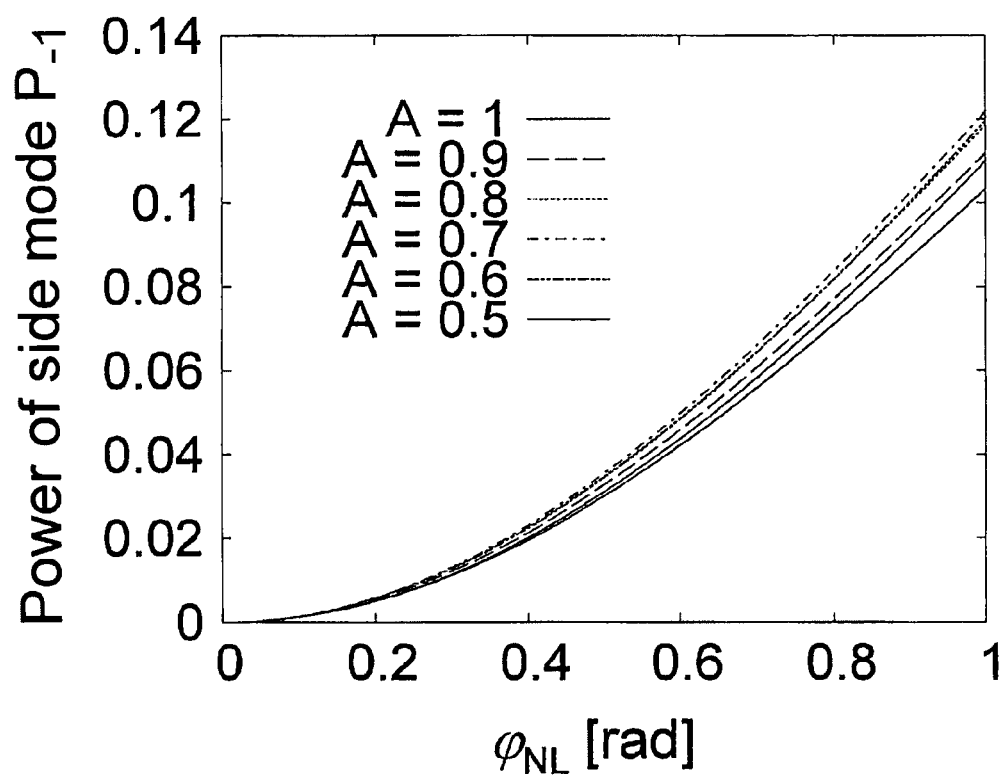
FIG. 5 is a view showing a power P−1 of the side mode when an amplitude ratio A is changed.
Figure 6:
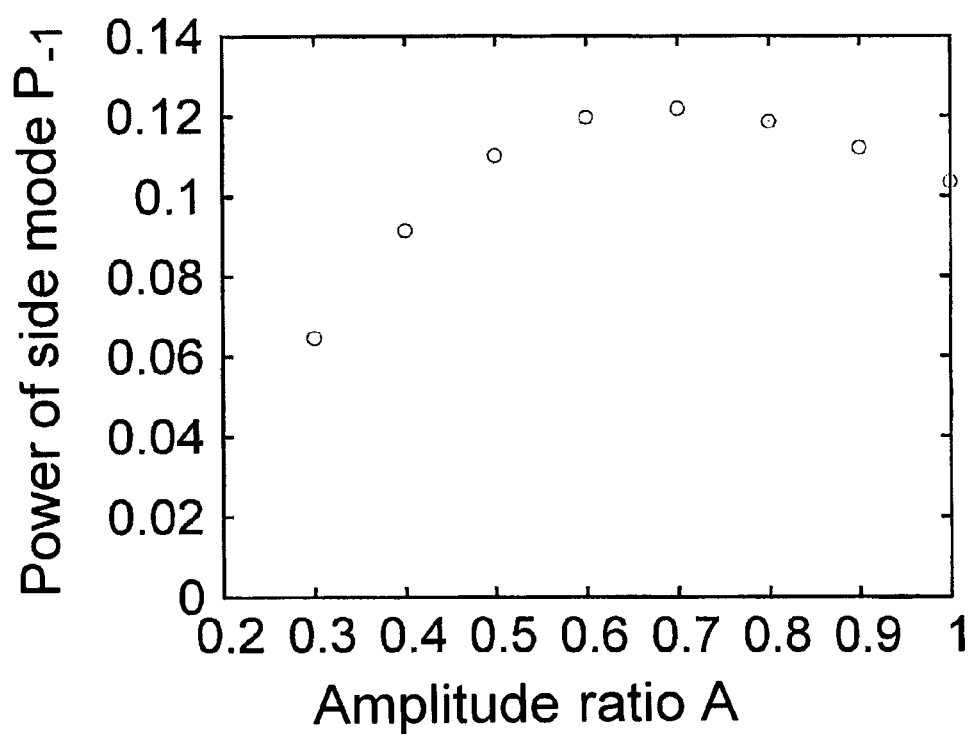
FIG. 6 is a view showing a relationship between the amplitude ratio A and the power P−1 of the side mode.

When $P_{ave}=1$ is determined and a value of A is changed to calculate a value of $P_{-1}$ with respect to $\phi_{NL}$ from 0 to 1, a result depicted in FIG. 5 can be obtained. Further, respective values of $P_{-1}$ with respect to A when $\phi_{NL}=1$ is determined are as shown in FIG. 6. Based on these results, it can be understood that production of a side mode component having a frequency $-\Delta\omega$ has the highest efficiency with respect to $\phi_{NL}$ that is approximately 1 when A=0.7.

Figure 7:
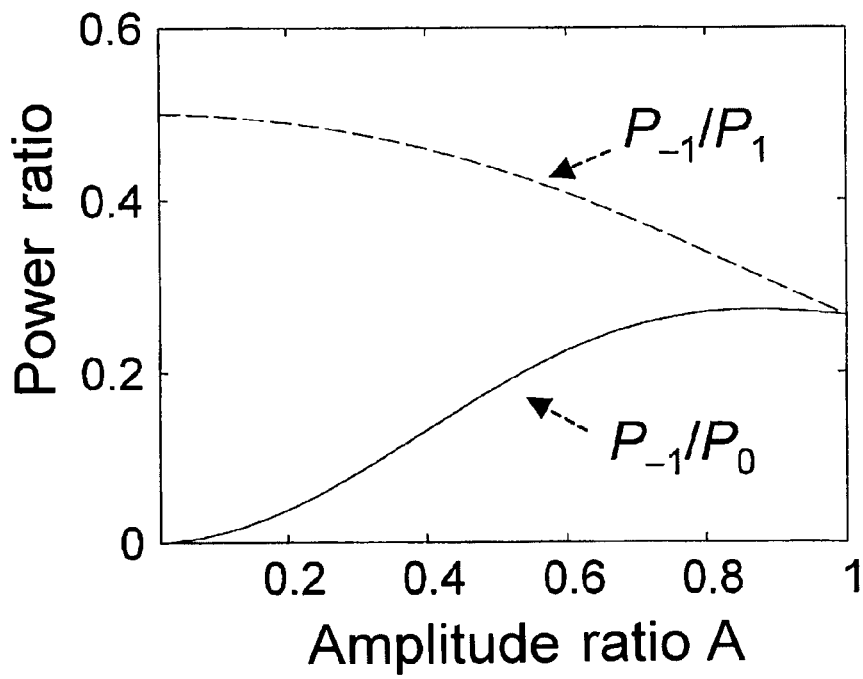
FIG. 7 is a view showing values of power ratios P−1/P0 and P−1/P1 when a value of the amplitude ratio A is changed and φNL=1 is set.

Further, FIG. 7 shows values of power ratios $P_{-1}/P_0$ and $P_{-1}/P_1$ when a value of A is changed and $\phi_{NL}=1$ is determined. The power ratio $P_{-1}/P_0$ is excellent when it takes a larger value, and it takes a maximum value when A=0.88 as shown in FIG. 7. The power ratio $P_{-1}/P_1$ is excellent when it takes a value close to 1, and A is good when it takes a smaller value as shown in FIG. 7, but a maximum value is 0.5. Based on these results, as the amplitude ratio A, a value equal to or smaller than 0.88 is desirable.

On the other hand, in regard to a power of a time waveform of the unbalanced beat light, a peak/floor ratio defined as a minimum value Pmin with respect to a maximum value Pmax is defined by the following Equation (11).

[Equation 11]

$$\frac{P_{min}}{P_{max}} = \left(\frac{1-A}{1+A}\right)^2 \quad \text{(Equation 11)}$$

Figure 8:
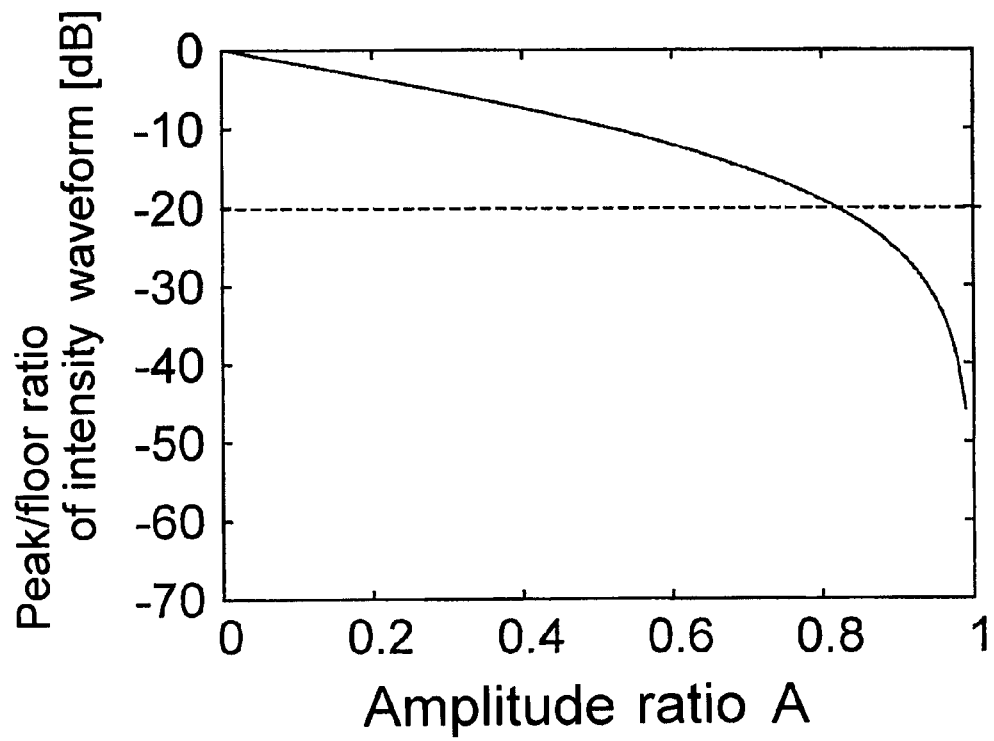
FIG. 8 is a view showing a value of a peak/floor ratio with respect to the amplitude ratio A.

Considering characteristics of the pulse train, a smaller peak/floor ratio is better, and a value equal to or smaller than −20 dB is desirable, for example. FIG. 8 shows a value of the peak/floor ratio with respect to the amplitude ratio A. Although the peak/floor ratio is increased as A is reduced, A>0.82 is required to set the peak/floor ratio to −20 dB or below.

Based on the above explanation, considering an efficiency for generation of the side modes and the condition that the peak/floor ratio is set to −20 dB or below, it is desirable for the amplitude ratio A of the unbalanced beat light to fall within the range of 0.82 to 0.88, and this ratio can be set to, e.g., a value A=0.85.

A first example where the optical pulse train generator 10 depicted in FIG. 1 is used to generate an in-phase optical pulse train having a repetition frequency $\Delta f$ of, e.g., 160 GHz will now be explained hereinafter. In the beat light generation means 11, a continuous light having a wavelength of 1550 nm is combined with a continuous light having a wavelength of 1551.28 nm (a frequency difference is 160 GHz) to generate the beat light 21 having a repetition frequency of 160 GHz. Furthermore, when an amplitude ratio of the two continuous lights is set to 1:0.85, the beat light 21 is determined as an unbalanced beat light having a power ratio of 1:0.72. Moreover, an average power after transmitted through the BPF 11d having a full width at half maximum 4.7 nm is set to 23.6 dBm (229 mW).

Then, in order to generate side modes of the beat light 21 having the repetition frequency of 160 GHz based on the FWM, the highly nonlinear fiber 12 is divided into the highly nonlinear fiber 12a having a fiber length of 100 m and the highly nonlinear fiber 12b having a fiber length of 200 m, and the isolator is interposed between them.

In regard to the highly nonlinear fiber 12 that produces the FWM, one having a dispersion value -0.1 [ps/nm/km], a dispersion slope 0.015 [ps/nm2/km], a nonlinear coefficient 15.8 [1/W/km], and a propagation loss 1.1 [dB/km] is used as the nonlinear fiber 12a, and one having a dispersion value 0.139 [ps/nm/km], a dispersion slope 0.0179 [ps/nm2/km], a nonlinear coefficient 11.4 [1/W/km], and a propagation loss 0.86 [dB/km] is used as the nonlinear fiber 12b.

Figure 9:
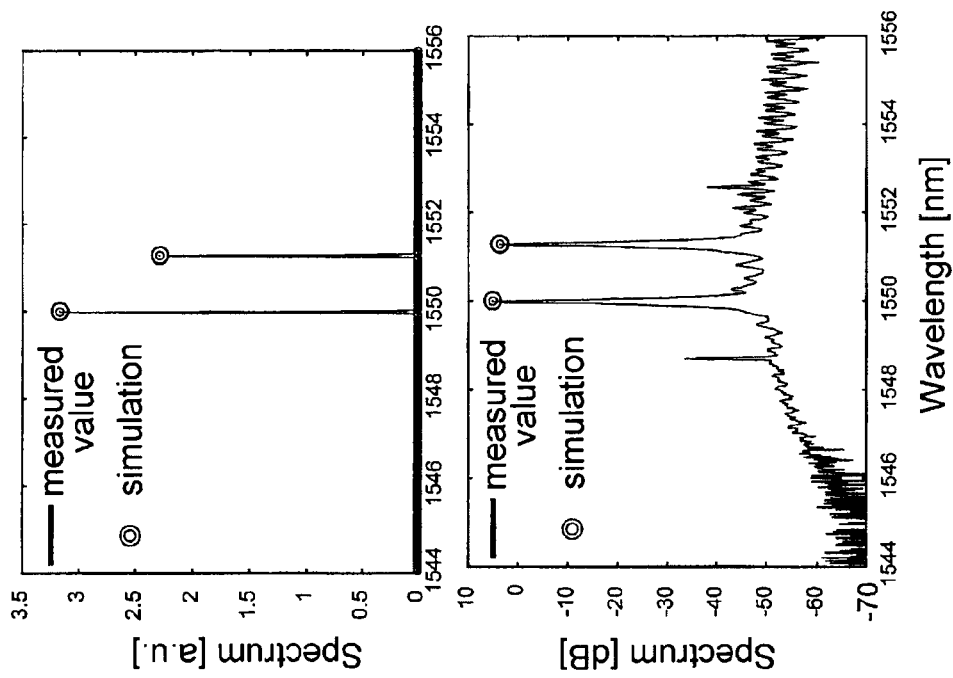
FIG. 9 is views showing a waveform of a beat light generated by beat light generation means, in which (a) shows the auto-correlation waveform and (b) shows the spectrum.
Figure 9:
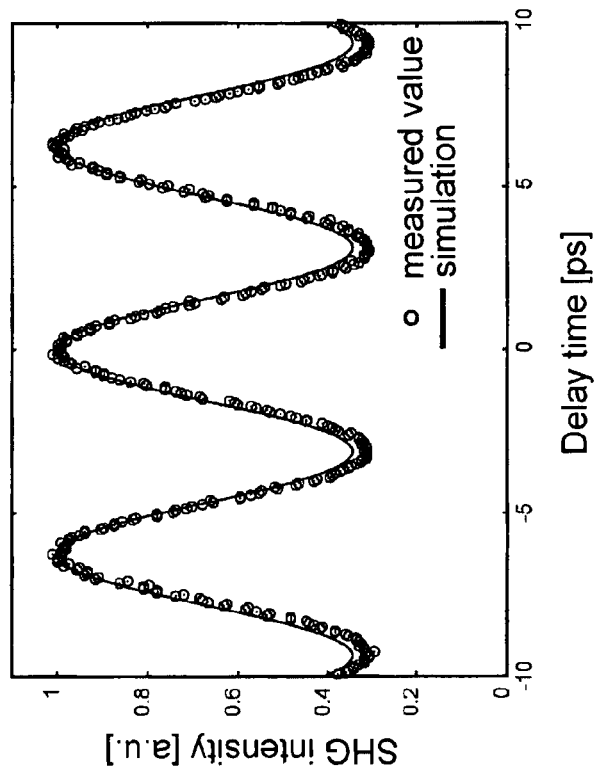

Further, one having a central frequency 1548 nm and a full width at half maximum 4.7 nm is used as the BPF 13, and the SMF 14 that performs chirp compensation for the in-phase optical pulse train 23 has a fiber length 50 m. Each optical pulse train generated in the example will now be explained hereinafter by using measured values. First, FIG. 9 shows an example of the unbalanced beat light 21 generated by the beat light generation means 11. In the drawing, (a) shows the auto-correlation waveform of the beat light 21, and (b) shows the spectrum. In the spectrum in FIG. 9(b), an upper side shows the spectrum when an ordinate is a linear axis, and a lower side shows the spectrum when an ordinate is a logarithmic axis.

Two peaks having different intensities are observed in the spectrum in FIG. 9(b), which means that the beat light 21 in this example is the unbalanced beat light. Furthermore, although FIG. 9 also shows a comparison between measured values and simulation values, the beat light 21 used in simulation has both the auto-correlation waveform and the spectrum excellently coinciding with measured results.

Figure 10:
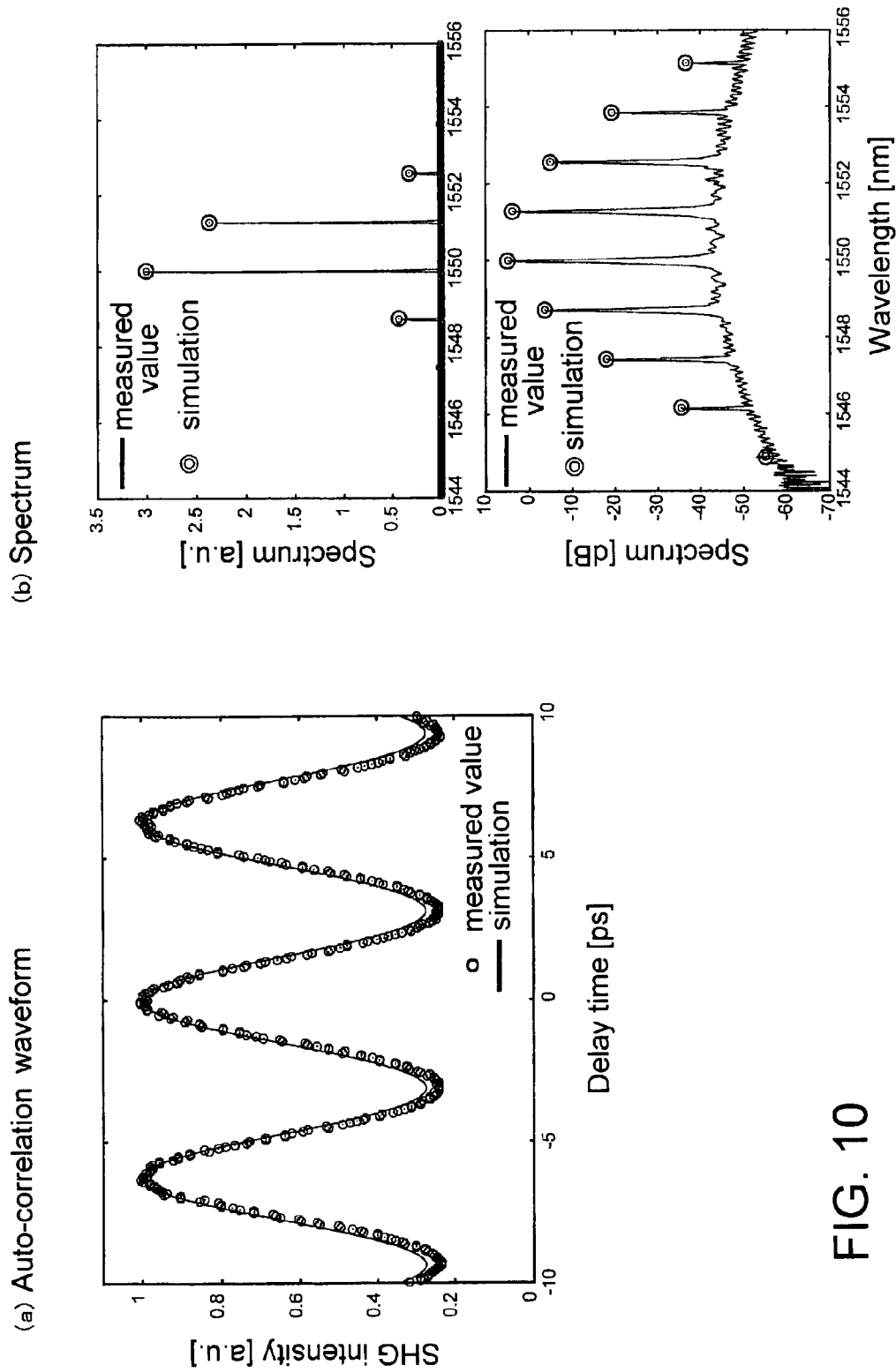
FIG. 10 is views showing a waveform of an optical pulse train with side modes generated in a highly nonlinear fiber, in which (a) shows the auto-correlation waveform and (b) shows the spectrum.

FIGS. 10(a) and (b) show the auto-correlation waveform and the spectrum of the pulse train 22 having side modes of the unbalanced beat light 21 formed based on the FWM in the highly nonlinear fiber 12. It can be confirmed from the spectrum in FIG. 10(b) that side modes are generated based on the FWM. Moreover, a result of simulation using the beat light depicted in FIG. 9 is also shown, and this result excellently coincides with measured results.

Figure 11:
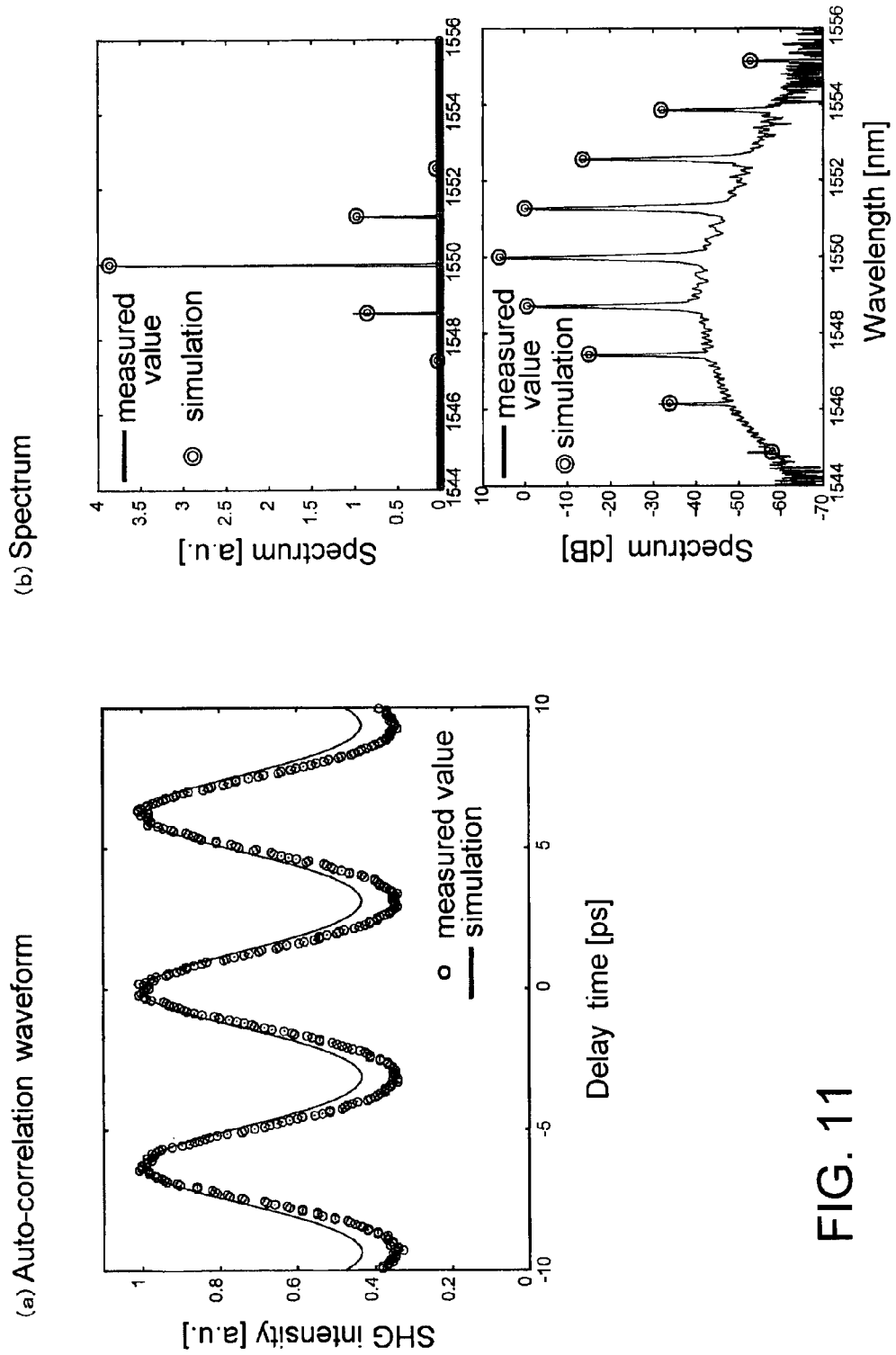
FIG. 11 is views showing a waveform of an optical pulse train shaped by BPF, in which (a) shows the auto-correlation waveform and (b) shows the spectrum.

FIGS. 11(a) and (b) show the auto-correlation waveform and the spectrum of the pulse train 23 formed by shaping the pulse train 22 by the BPF 13, respectively. It can be understood from the spectrum in FIG. 11(b) that powers of side modes are substantially equal with a central wavelength determined as a symmetry axis and the spectrum the pulse train 23 form a symmetrical preferable waveform. Additionally, a simulation result substantially excellently coincides with measured results.

Figure 12:
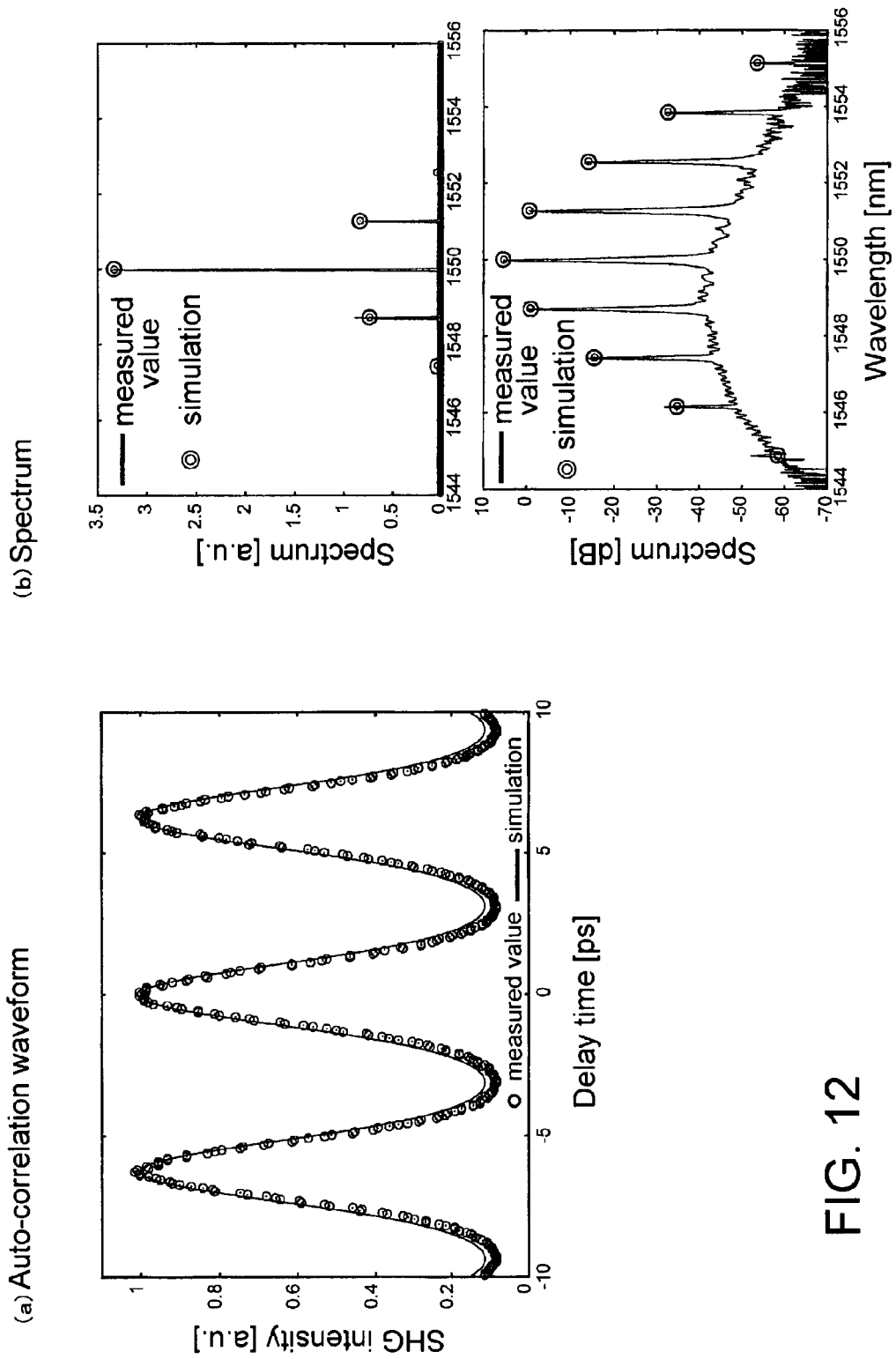
FIG. 12 is views showing a waveform of an optical pulse train subjected to chirp compensation by SMF, in which (a) shows the auto-correlation waveform and (b) shows the spectrum.

Further, FIGS. 12(a) and (b) show the auto-correlation waveform and the spectrum of the pulse train 24 shaped based on chirp compensation by the SMF 14, respectively. It can be confirmed from FIG. 12(a) that chirp compensation is appropriately carried out and a pulse width is thereby reduced to shape a sharp waveform. Furthermore, a simulation result excellently coincides with measured results.

It was confirmed from the example that the optical pulse train generator 10 according to the first embodiment depicted in FIG. 1 can generate an optical pulse train having a high repetition frequency exceeding 100 GHz in a high-quality state. An excellent characteristic lies in that the optical pulse train 24 generated by the optical pulse train generator 10 is an in-phase pulse train having uniform phases of respective pulses.

A second example where the optical pulse train generator 10 depicted in FIG. 1 is used to generate an in-phase optical pulse train will now be explained. In this example, the beat light generation means 11 combines a continuous light having a wavelength of 1551.06 nm (193.287 THz) with a continuous light having a wavelength of 1549.78 nm (193.447 THz) to produce a beat light 21 having a repetition frequency of 160 GHz. The former continuous light is determined as a main mode, and the latter continuous light is determined as a side mode. In this example, outputs of the respective continuous lights are 15.62 dBm and 14.02 dBm and a power ratio of the same is a value slightly deviating from 1:0.72 at the present moment in this example, but this is a result of performing adjustment to provide an unbalanced beat light having a power ratio of 1:0.72 after transmitted through the EDFA 11c and the BPF 11d. An average power of the beat light 21 after transmitted through the BPF 11d having a full width at half maximum 4.7 nm is 24.95 dBm. This example is different from the first example in wavelengths of the two continuous lights and an average power of the beat light 21.

The highly nonlinear fiber 12 that generates side modes of the beat light 21 based on the FWM is configured under such conditions as depicted in Table 1. The conditions are the same as those in the first example. Furthermore, an isolator 15 is likewise interposed between highly nonlinear fibers 12a and 12b in this example. The SMF 14 also has the same conditions as those in the first example, and the SMF 14 having a fiber length of 50 m is used. Although transmission characteristics of the BPF 13 having a full width at half maximum of 4.7 nm are the same as those in the first example, a central wavelength is different and it is 1552.6 nm.

TABLE 1

|  | HNLF 12a | HNLF 12b |
|---|---|---|
| Fiber length [m] | 100 | 200 |
| Dispersion value [ps/nm/km] | −0.1 | 0.139 |
| Dispersion slope value [ps/nm$^2$/km] | 0.015 | 0.0179 |
| Nonlinear coefficient [W$^{-1}$km$^{-1}$] | 15.8 | 11.4 |
| Propagation loss [dB/km] | 1.1 | 0.86 |

In this example carried out under the above conditions, a measurement result of each optical pulse train generated on each stage will now be explained. It is to be noted that, in regard to the auto-correlation waveform explained below, a measured value is compared with the following fitting expression. Assuming that an amplitude ratio (an amplitude unbalance ratio) of continuous lights respectively output from the DFB-LDs 11a and 11b is A, a delay time is τ, and the auto-correlation waveform is R(τ), R(τ) is calculated based on the following Equation (12).

[Equation 12]

$$R(\tau) = \frac{(1+A^2)^2 + 2A^2\cos 2\pi \Delta f \tau}{(1+A^2)^2 + 2A^2} \quad \text{(Equation 12)}$$

(Equation 12) corresponds to the auto-correlation waveform when an electric field amplitude of an unbalanced light is represented by the following Equation (13), and A=0.85 and Δf=0.16 [THz] are determined in accordance with experimental conditions.

[Equation 13]

$$1+Ae^{[i(2\pi\Delta f t)]} \quad \text{(Equation 13)}$$

Figure 13:
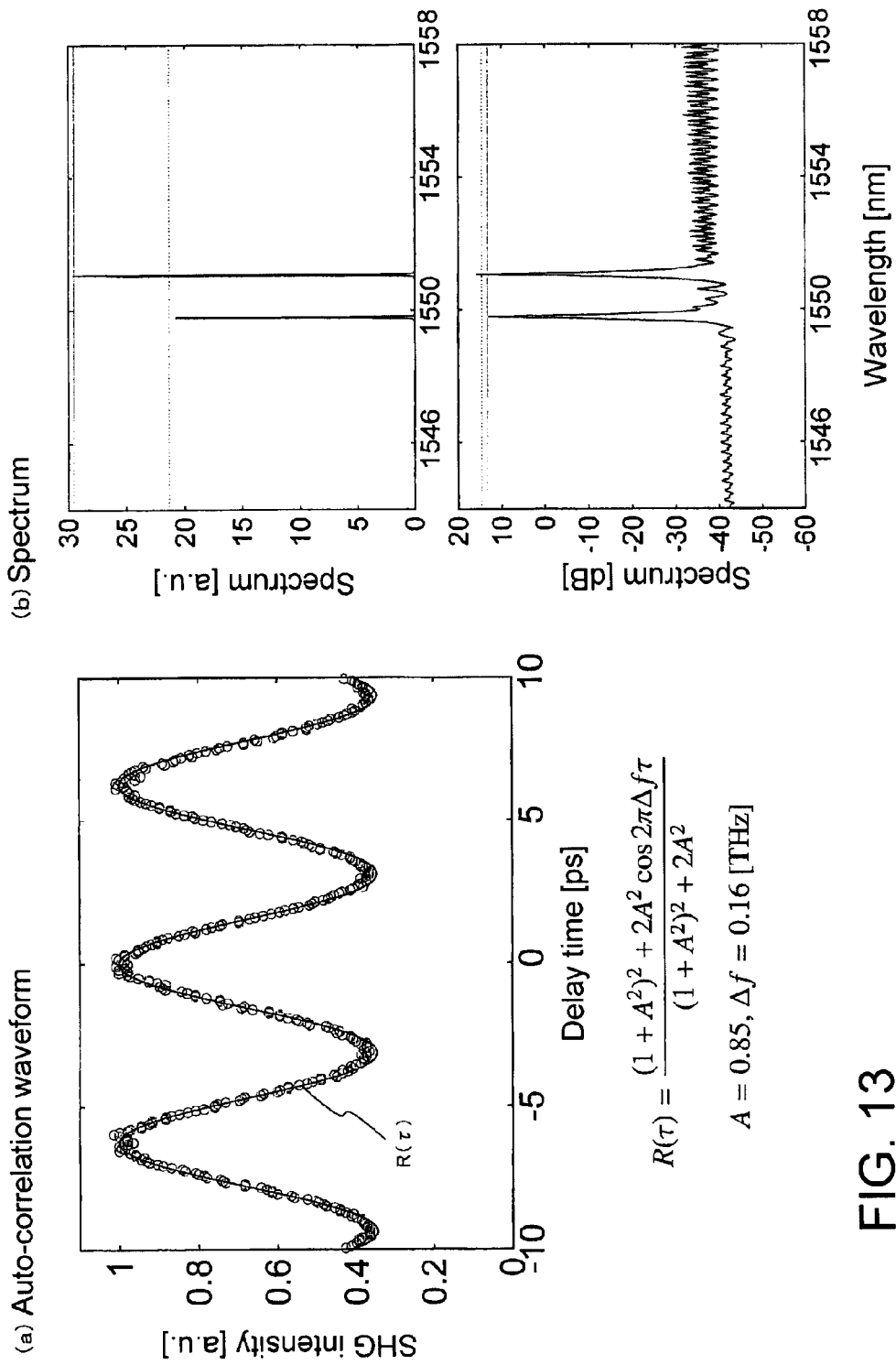
FIG. 13 is views showing a waveform of a beat light according to another embodiment as a 3-dB coupler output immediately after generation of the beat light, in which (a) shows the auto-correlation waveform and (b) shows the spectrum.

First, FIG. 13 shows measured values of an unbalanced beat light 20 as an output from the 3-dB coupler 11e in the beat light generation means 11. In the drawing, (a) shows the auto-correlation waveform of the beat light 20 and (b) shows the spectrum. In the spectrum in FIG. 13(b), an upper side shows the spectrum when an ordinate is a linear axis, and a lower side shows the spectrum when an ordinate is a logarithmic axis.

In the auto-correlation waveform depicted in FIG. 13(a), it can be confirmed that measured values excellently match with the fitting expression of (Equation 12). Furthermore, in the spectrum in FIG. 13(b), two peaks having different intensities are observed like the first example, which means that the beat light 20 in this example is an unbalanced beat light.

Figure 14:
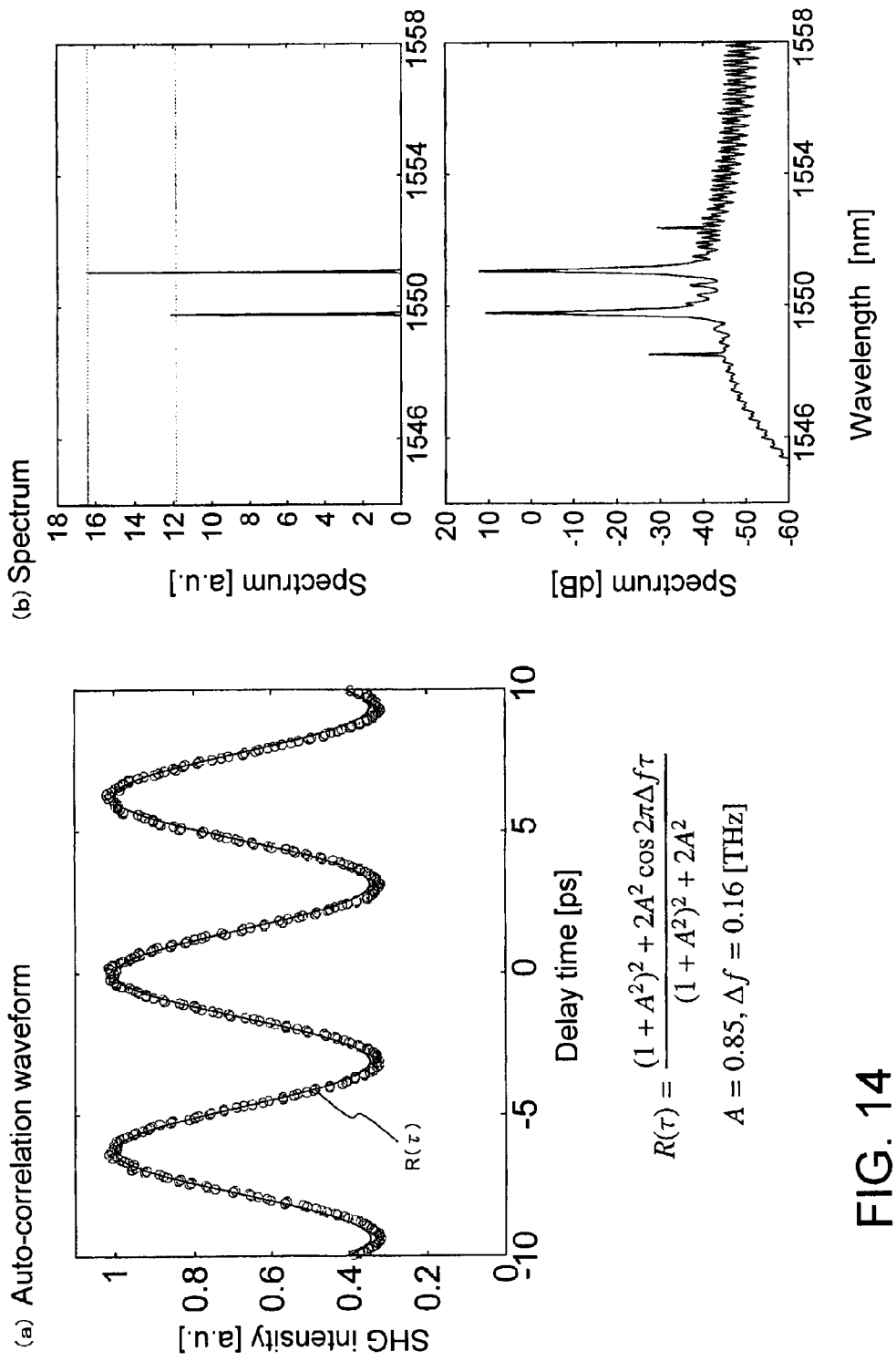
FIG. 14 is views showing a waveform of a beat light according to another example generated by the beat light generation means, in which (a) shows the auto-correlation waveform and (b) shows the spectrum.

FIG. 14(a) shows the auto-correlation waveform and FIG. 14(b) shows the spectrum as measured values of an unbalanced beat light 21 when the beat light 20 is amplified by the EDFA 11c of the beat light generation means 11 and output from the BPF 11d of the same. The auto-correlation waveform depicted in FIG. 14(a) is substantially maintained as it is from a moment before amplification, and it can be confirmed that noise components are suppressed in the spectrum depicted in FIG. 14(b). A power ratio of both modes obtained from the spectrum depicted in FIG. 14(b) is 1:0.72.

Figure 15:
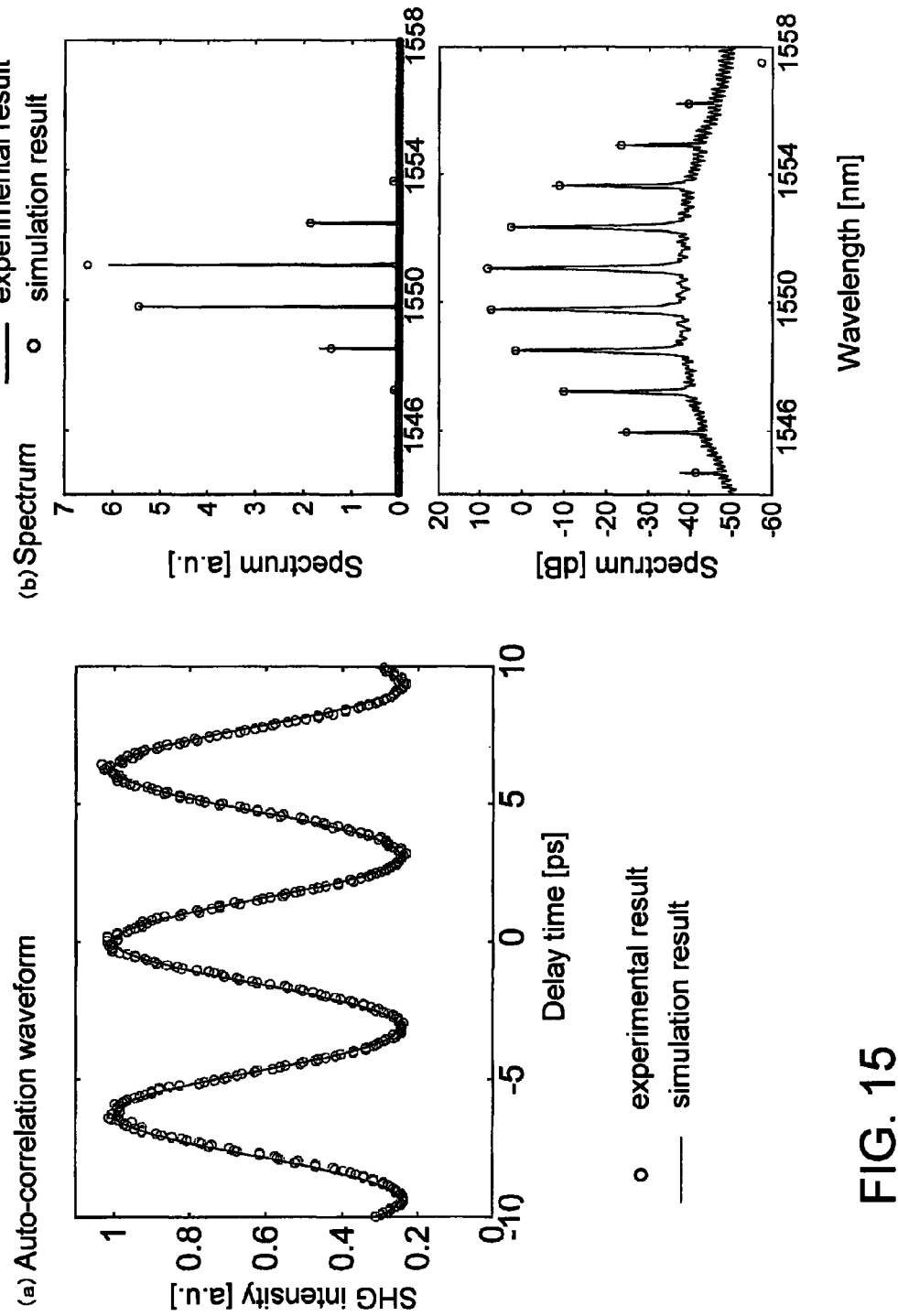
FIG. 15 is views showing a waveform of an optical pulse train with side modes generated in a highly nonlinear fiber according to another example, in which (a) shows the auto-correlation waveform and (b) shows the spectrum.

FIGS. 15(a) and (b) show measured values of the auto-correlation waveform and the spectrum of a pulse train 22 having side modes of the unbalanced beat light 21 formed based on the FWM in the highly nonlinear fiber 12, respectively. It is to be noted that FIG. 15 also shows a simulation result in addition to a measurement result. It can be confirmed from the spectrum in FIG. 15(b) that side modes are likewise generated based on the FWM in this example. Moreover, at this moment, powers of the side modes provided at symmetrical positions are asymmetrical.

Figure 16:
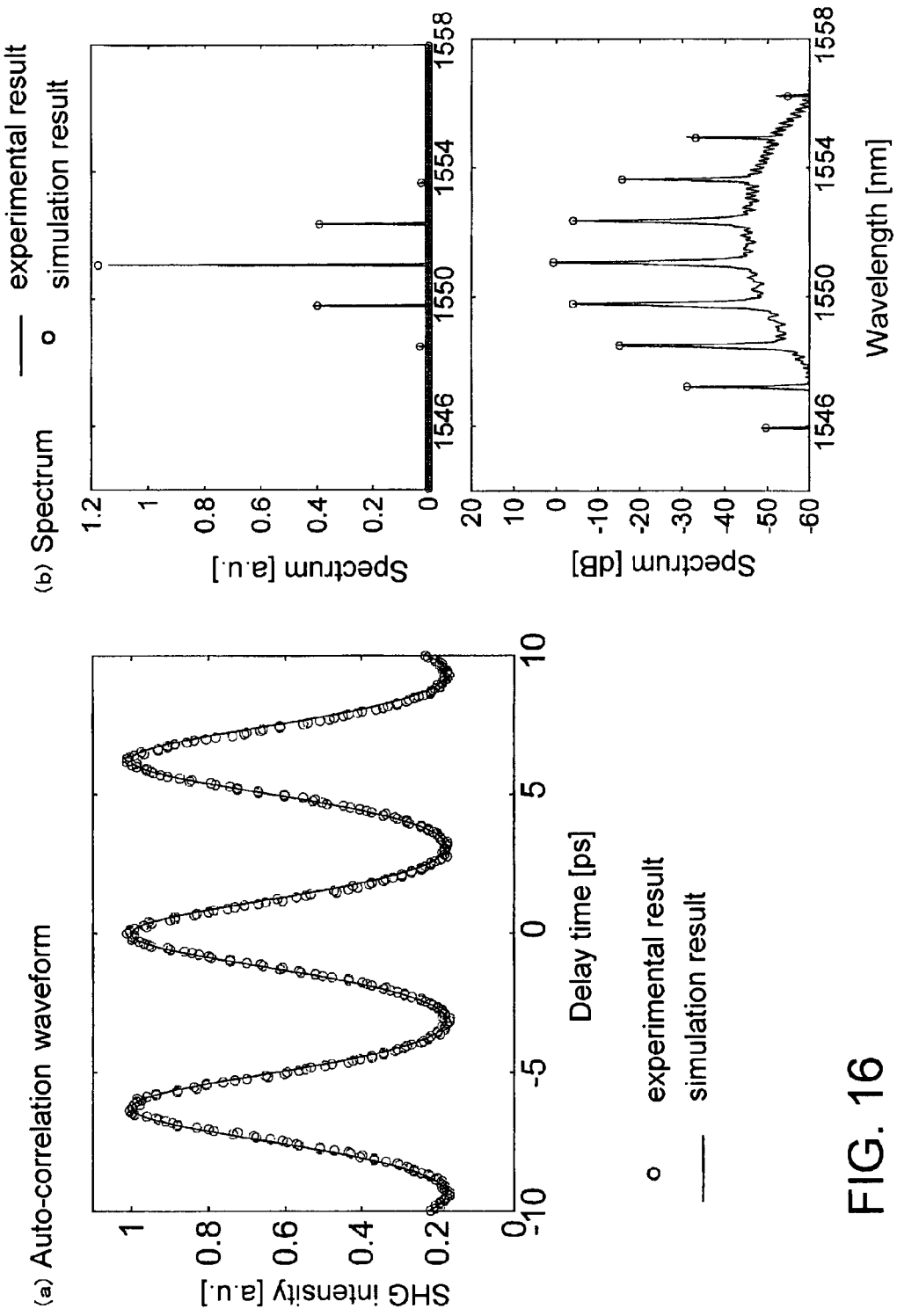
FIG. 16 is a view showing a waveform of an optical pulse train according to another example subjected to chirp compensation by SMF, in which (a) shows the auto-correlation waveform and (b) shows the spectrum.
Figure 17:
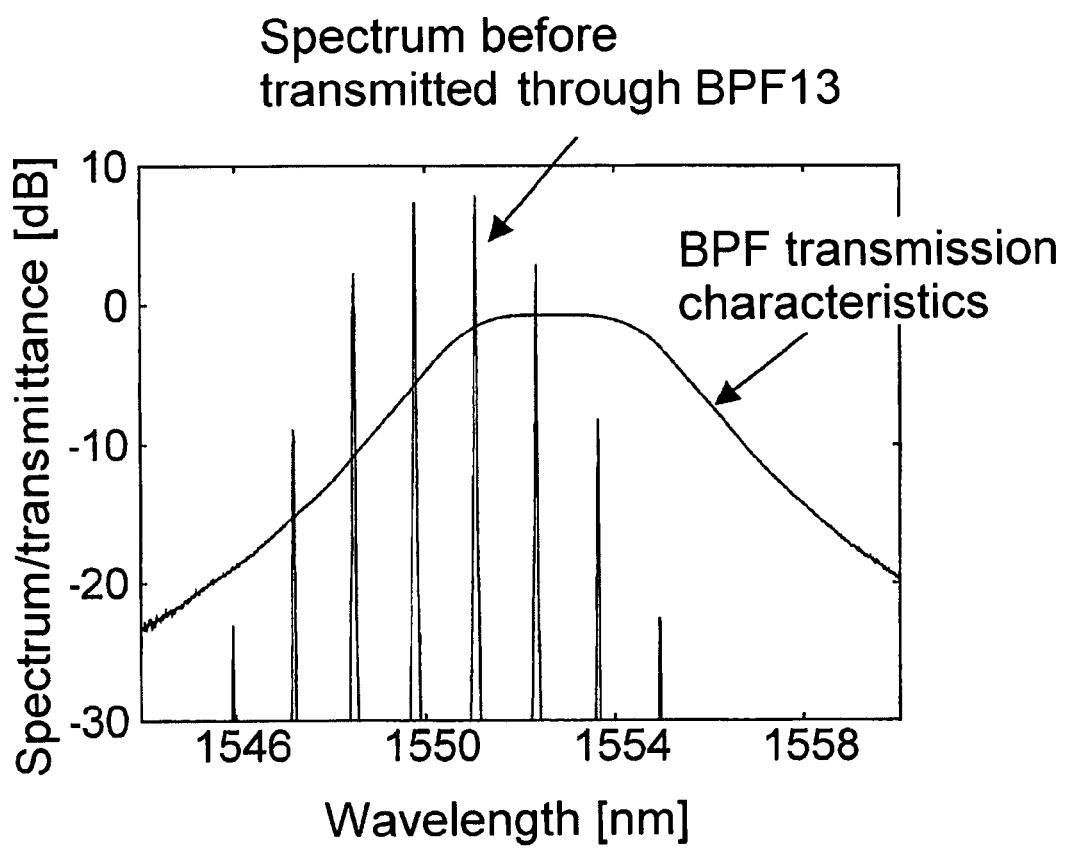
FIG. 17 is a view showing a comparison between the spectrum of a pulse train and the wavelength-characteristics of the transmission loss of BPF on a logarithmic axis.

Additionally, FIGS. 16(a) and (b) show the auto-correlation waveform and the spectrum of a pulse train 23 obtained by shaping the pulse train 22 by the BPF 13, respectively. In the spectrum depicted in FIG. 16(b), powers of side modes provided on left and right sides with a wavelength as a symmetry axis at the center are substantially equal to each other, and it can be understood that the spectrum of a pulse train 24 form a symmetrical preferable waveform. FIG. 17 depicts a result of showing both the spectrum of the pulse train 22 and the wavelength characteristics of a transmission loss of the BPF 13 on a logarithmic axis. It can be confirmed from results of FIGS. 16 and 105 that a central wavelength of the BPF 13 is preferably adjusted so as to equalize the powers of the side modes on both the left and right sides in the spectrums of the pulse train 23.

Figure 18:
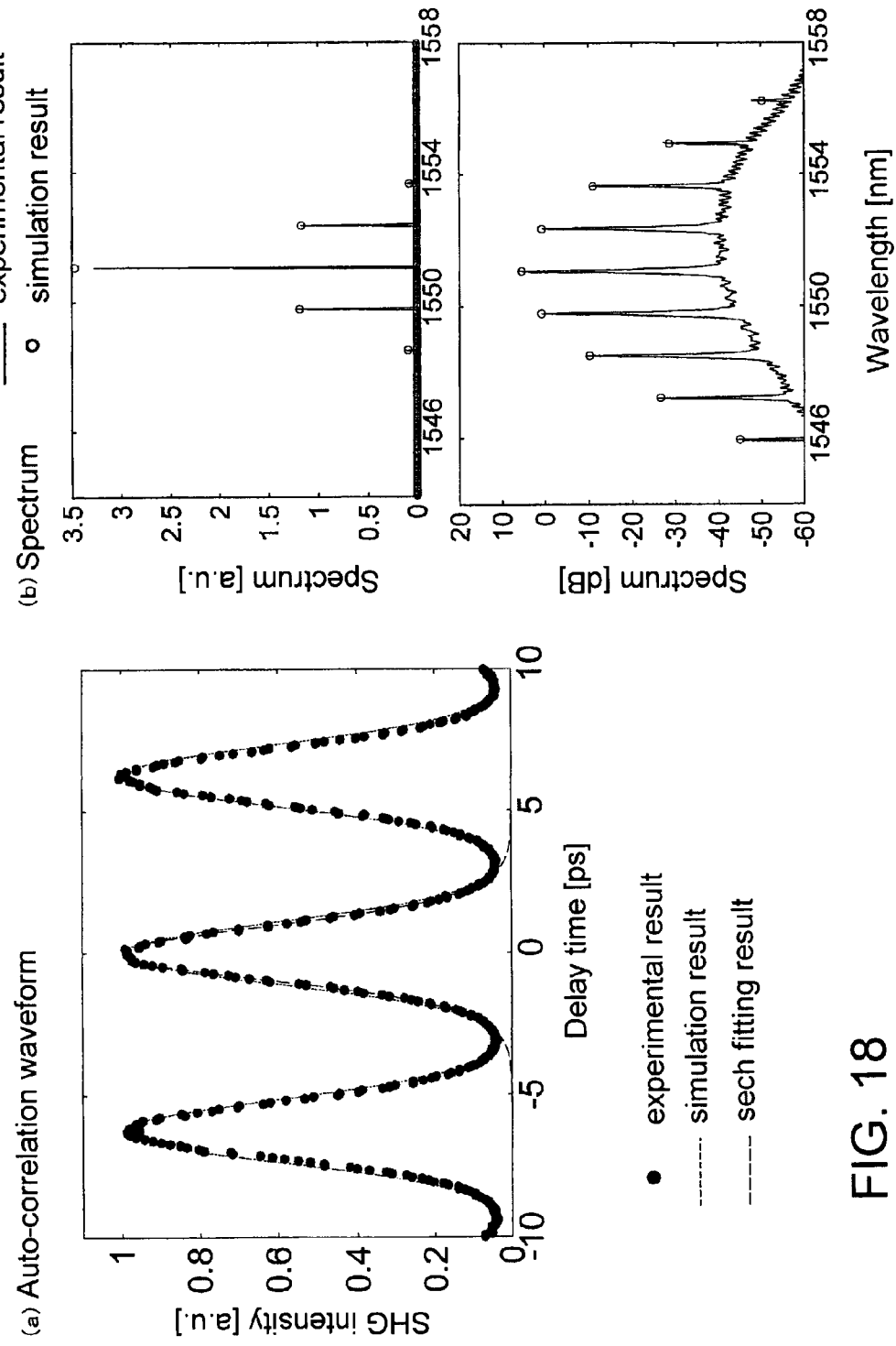
FIG. 18 is views showing the auto-correlation waveform and the spectrum of a pulse train shaped based on chirp compensation by SMF.

FIGS. 18(a) and (b) show the auto-correlation waveform and the spectrum of the pulse train 24 shaped by performing chirp compensation by the SMF 14, respectively. The drawing of the auto-correlation waveform also shows a result obtained by effecting each fitting in addition to measured values and a simulation result. Although the spectrum depicted in FIG. 18(b) are the same as those depicted in FIG. 16(b), the width of the temporal waveform is compressed as a result of appropriately compensating each chirp in the auto-correlation waveform depicted in FIG. 18(a), and it can be understood that a shape preferable as a pulse waveform is obtained. The full width at half maximum (FWHM) obtained by performing sech fitting with respect to the auto-correlation waveform was 1.52 ps. In this example, likewise, it can be confirmed that the optical pulse train generator 10 according to this embodiment depicted in FIG. 1 can obtain an in-phase optical pulse train with a high repetition frequency exceeding 100 GHz in a high-quality state.

Figure 19:
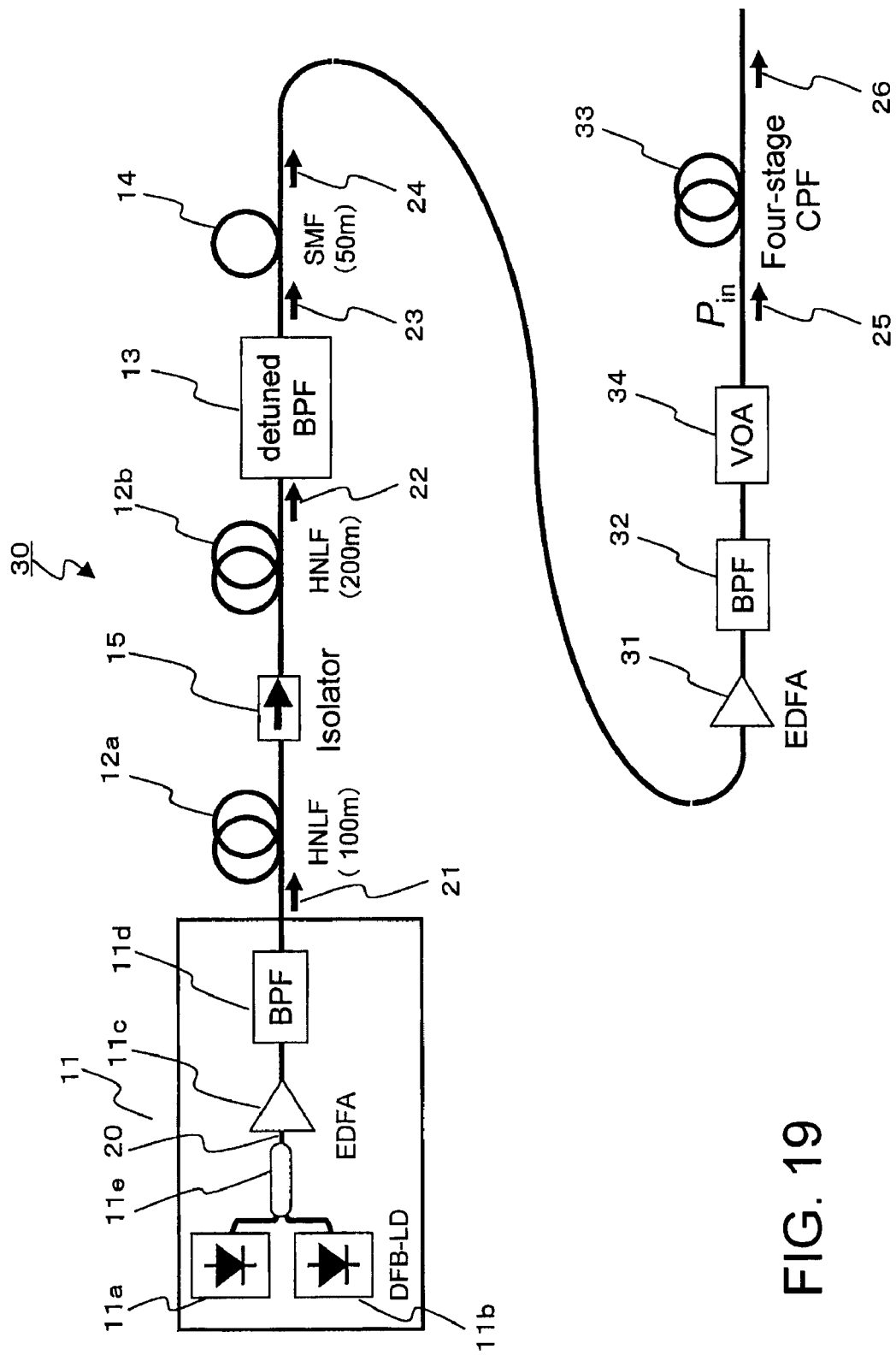
FIG. 19 is a block diagram showing a structure of an optical pulse train generator according to a second embodiment of the present invention.

An optical pulse train generator according to a second embodiment of the present invention will now be explained with reference to FIG. 19. An optical pulse train generator 30 according to this embodiment has a structure where an EDFA 31, a BPF 32, and a CPF 33 are further added to the optical pulse train generator 10 according to the first embodiment. It is to be noted that a variable optical attenuator (VOA) 34 is provided on an inlet side of the CPF 33 in the structure depicted in FIG. 19 so as to change a power of an optical pulse train 25 input to the CPF 33.

In the optical pulse train generator 30 according to this embodiment, an optical pulse train 24 compressed by an SMF 14 is amplified by the EDFA 31, ASE noise is suppressed by the BPF 32 having a full width at half maximum of 4.7 nm, and then the pulse train is further compressed by the CPF 33. The CPF 33 in this embodiment is configured by combining HNLFs and SMFs having characteristics depicted in Table 2 and such fiber lengths as shown in Table 3 on four stages. Further, each isolator is provided between the first stage and the second stage and between the second stage and the third stage.

TABLE 2

| Fiber parameters | HNLF | SMF |
| --- | --- | --- |
| Dispersion value (@1550 nm) [ps/nm/km] | −0.58 | 16.264 |
| Dispersion slope value [ps/nm2/km] | 0.0248 | 0.0586 |
| Nonlinear coefficient [W$^{-1}$km$^{-1}$] | 11.27 | 1.3 |
| Propagation loss [dB/km] | 0.8 | 0.2 |

TABLE 3

| CPF design | HNLF length [m] | SMF length [m] |
| --- | --- | --- |
| First stage | 109 | 27.8 |
| Second stage | 104 | 18.5 |
| Third stage | 97 | 12.3 |
| Fourth stage | 86 | 8.2 |

Figure 20:
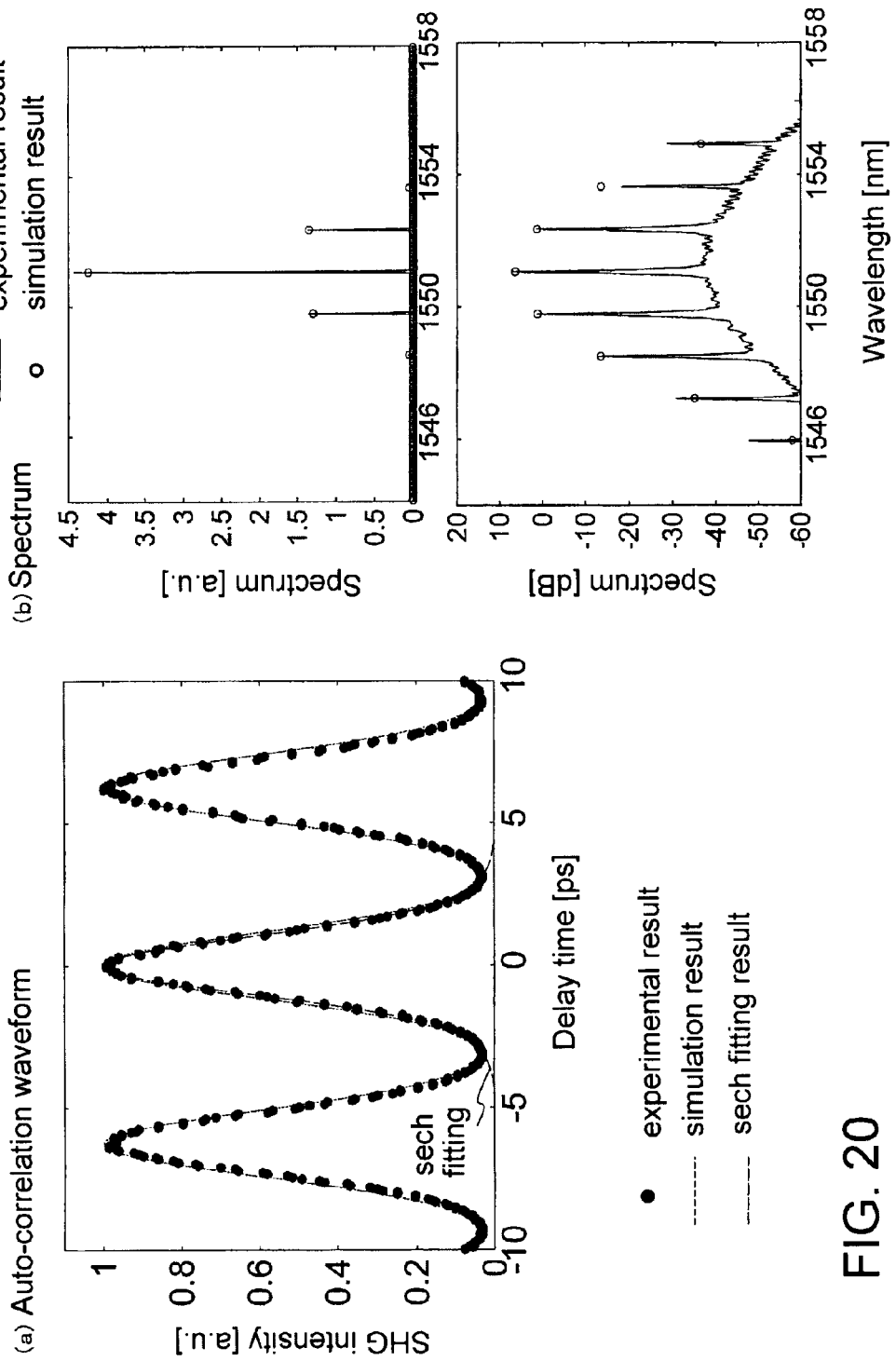
FIG. 20 is views showing a waveform of a CPF input optical pulse train, in which (a) shows the auto-correlation waveform and (b) shows the spectrum.
Figure 21:
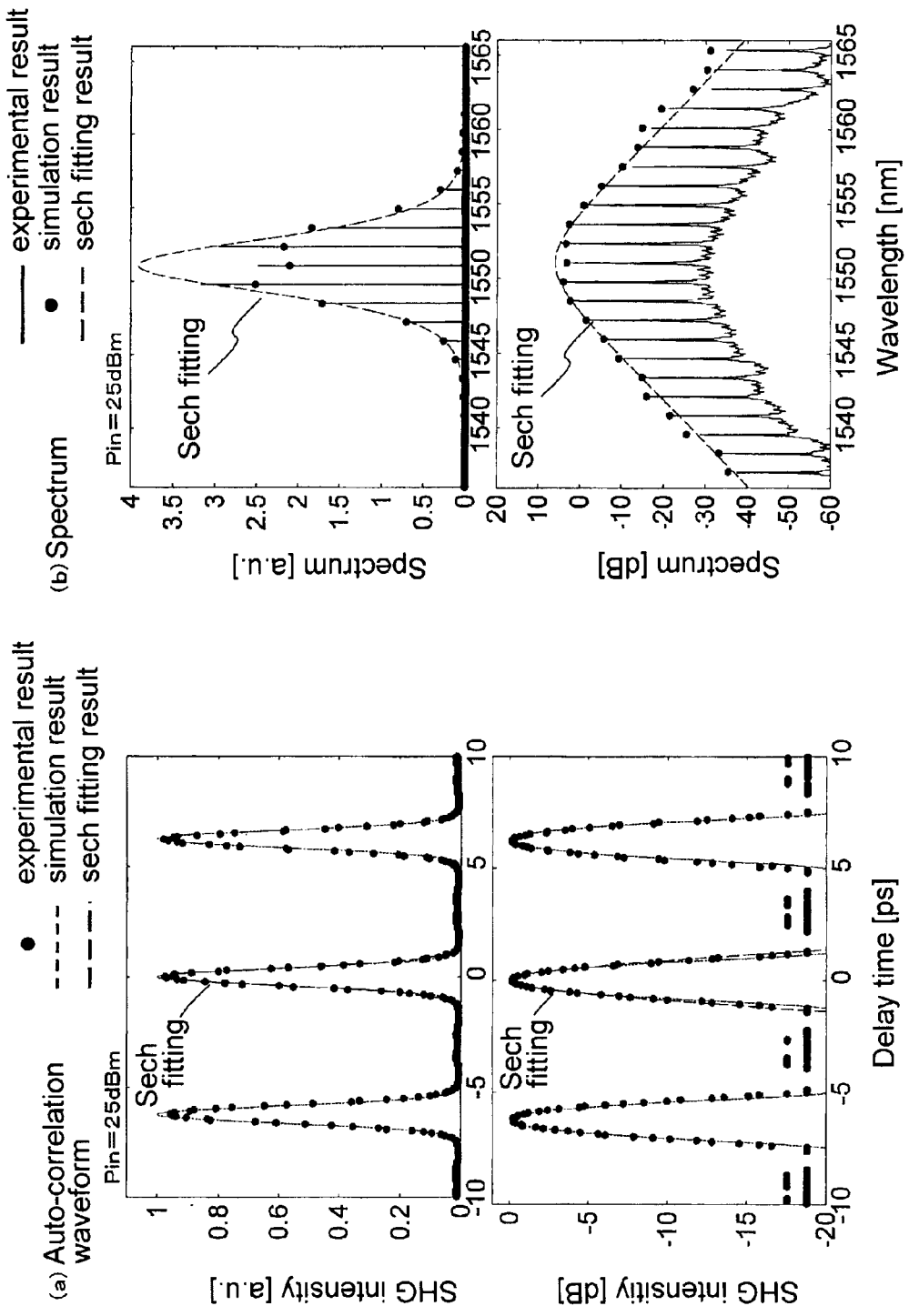
FIG. 21 is views showing a waveform of an optical pulse train after compression by CPF (Pin=25 dBm), in which (a) shows the auto-correlation waveform and (b) shows the spectrum.
Figure 22:
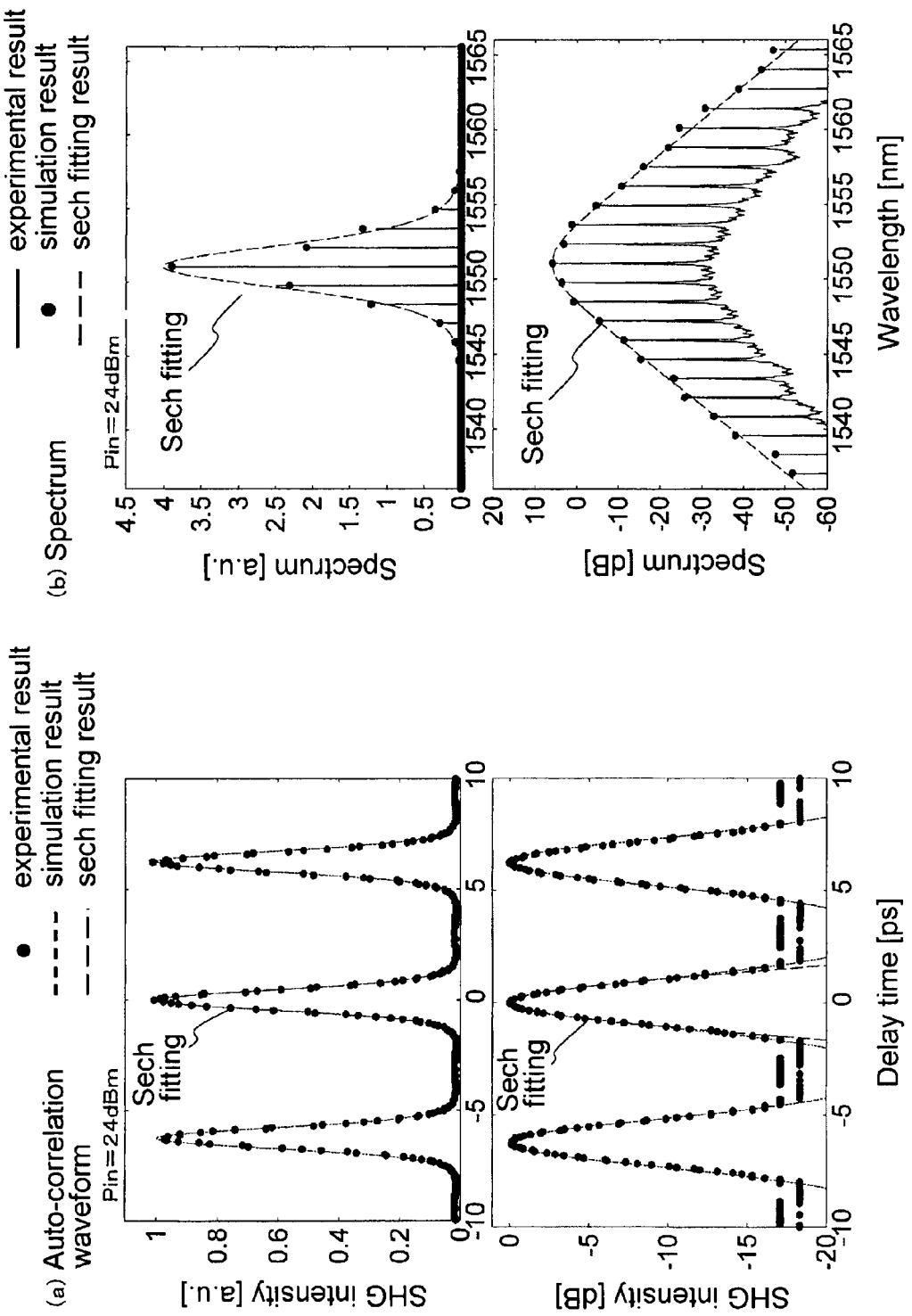
FIG. 22 is views showing a waveform of an optical pulse train after compression by CPF (Pin=25 dBm), in which (a) shows the auto-correlation waveform and (b) shows the spectrum.
Figure 23:
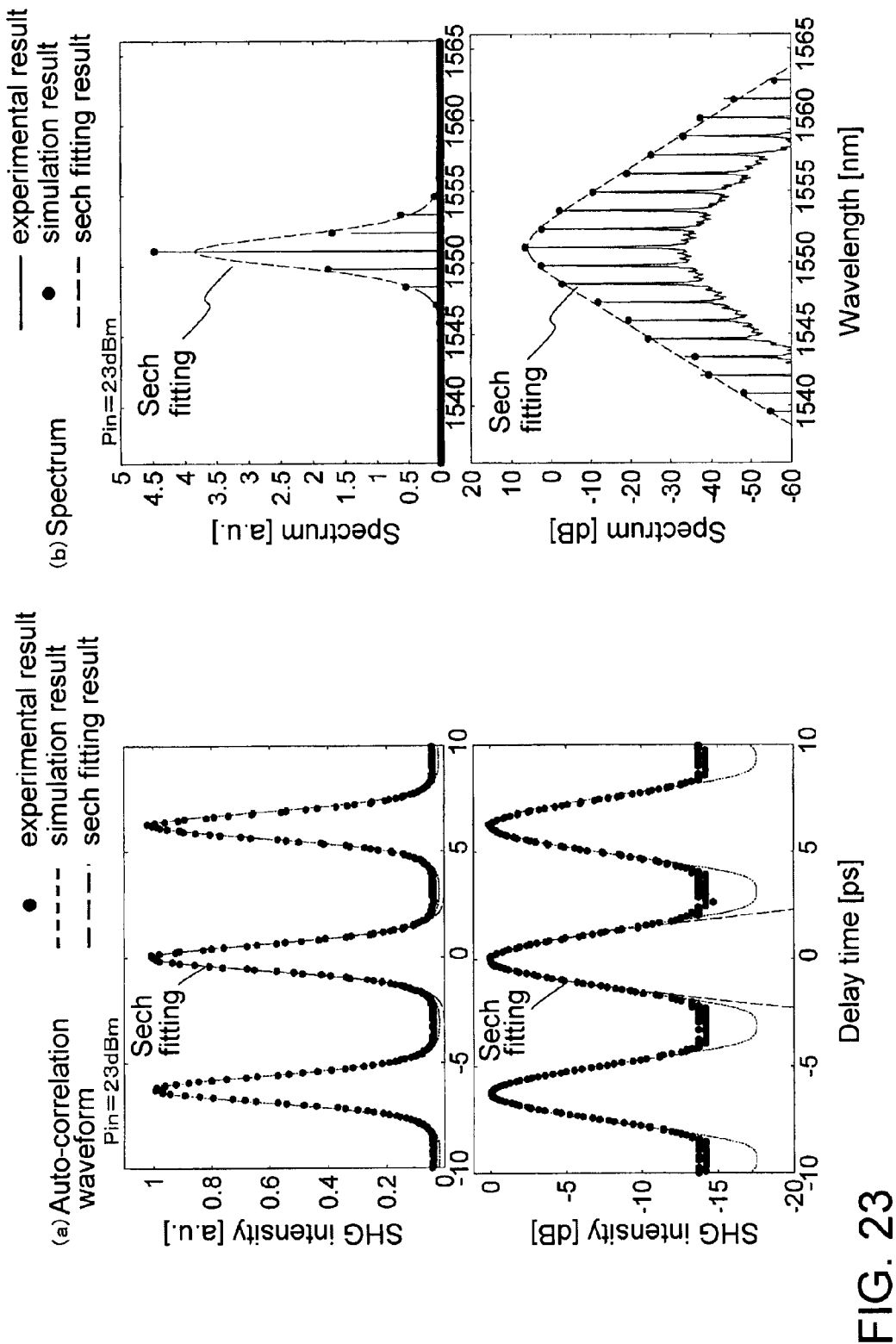
FIG. 23 is views showing a waveform of an optical pulse train after compression by CPF (Pin=23.5 dBm), in which (a) shows the auto-correlation waveform and (b) shows the spectrum.
Figure 24:
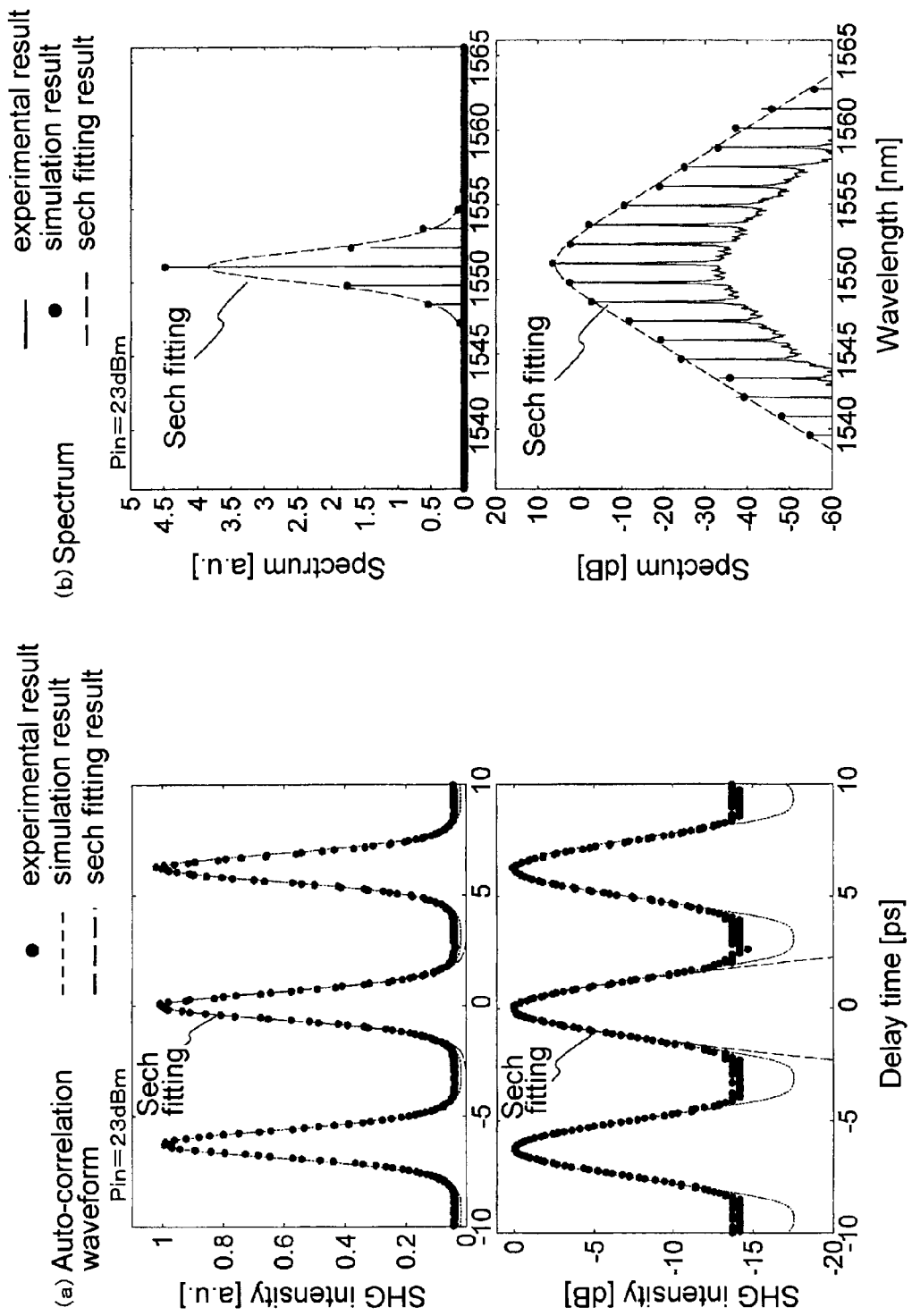
FIG. 24 is views showing a waveform of an optical pulse train after compression by CPF (Pin=23 dBm), in which (a) shows the auto-correlation waveform and (b) shows the spectrum.

An optical pulse train generated from the optical pulse train generator 30 according to this embodiment will now be explained with reference to measurement data. The optical pulse train 24 output from the SMF 14 is generated under the same conditions as those in the second example. FIG. 20 shows an example of a pulse train 25 input to the CPF 33. FIG. 20(a) shows the auto-correlation waveform of the pulse train 25, and FIG. 20(b) shows the spectrum. In regard to the spectrum depicted in FIG. 20(b), an upper side shows the spectrum when an ordinate is a linear axis, and a lower side shows the spectrum when an ordinate is a logarithmic axis.

As a result of performing fitting the auto-correlation waveform depicted in FIG. 20(a) by using a sech function, it was confirmed that the FWHM is 1.60 ps.

Measurement results obtained when an input power $P_{in}$ of the pulse train 25 input to the CPF 33 is changed by using the VOA 34 will now be explained. FIGS. 21 to 24 show measurement results of an output pulse train 26 of the CPF 33 obtained when the input power $P_{in}$ is changed to 25, 24, 23.5, and 23 dBm, respectively. In each drawing, (a) shows auto-correlation waveforms, and an upper side shows the auto-correlation waveform when an ordinate is a linear axis whilst a lower side shows the auto-correlation waveform when an ordinate is a logarithmic axis. Further, (b) shows the spectrum, and an upper side shows the spectrum when an ordinate is a linear axis whilst a lower side shows the spectrum when an ordinate is a logarithmic axis. In any case, measurement results in experiments, simulation results, and sech fitting results are depicted.

In any of FIGS. 21 to 24, it can be confirmed that the pulse train 26 is compressed, pedestal components are greatly suppressed, and a sech type excellent pulse waveform is obtained. Furthermore, it can be confirmed from the spectrum depicted in (b) of each drawing that an optical pulse train substantially corresponding to a Fourier transformation limit is obtained.

Figure 25:
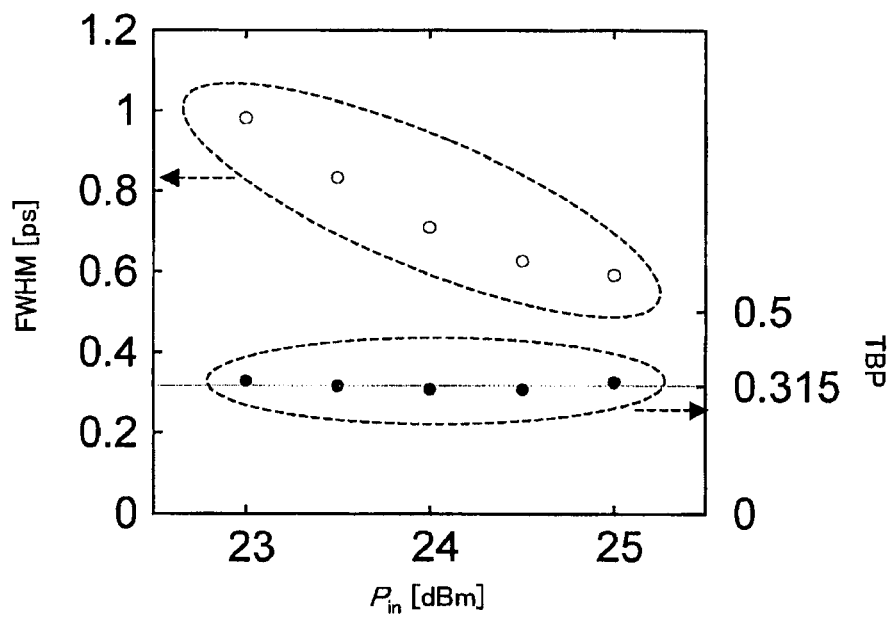
FIG. 25 is a view showing a relationship between the power Pin, the FWHM, and the TBP of a CPF input optical pulse train.

Table 4 and FIG. 25 show each FWHM and each time-bandwidth product (TBP) obtained by fitting the auto-correlation waveform and the spectrum by using a sech function in regard to a waveform of the output pulse train 26 of the CPF 33 obtained from an experiment when $P_{in}$ is set to 24.5 dBm in addition to the waveforms depicted in FIGS. 21 to 24. As a result, it can be understood that the FWHM is reduced to be further compressed as the input power $P_{in}$ is increased. On the other hand, a value of the TBP close to 0.315 that is an ideal value of a sech pulse is maintained, and it can be confirmed that excellent characteristics as a pulse light source are demonstrated.

TABLE 4

| $P_{in}$ [dBm] | FWHM [ps] | TBP |
| --- | --- | --- |
| 23 | 0.981 | 0.327 |
| 23.5 | 0.832 | 0.315 |
| 24 | 0.710 | 0.307 |
| 24.5 | 0.625 | 0.306 |
| 25 | 0.590 | 0.324 |

In the first embodiment and the second embodiment, when the EDFA is used to amplify a beat light or an optical pulse train, ASE noise components are produced in optical spectrums and amplified in subsequent processing, whereby many noise components may be possibly contained in the optical spectrum. For example, in the optical pulse train generator 30 according to the second embodiment, ASE noise components produced in the EDFA 11c are parametrically amplified by a nonlinear effect in the HNLFs 12a and 12b and further amplified in the EDFA 31, and new ASE noise components are added. These noise components are further parametrically amplified in the CPF 33.

Figure 26:
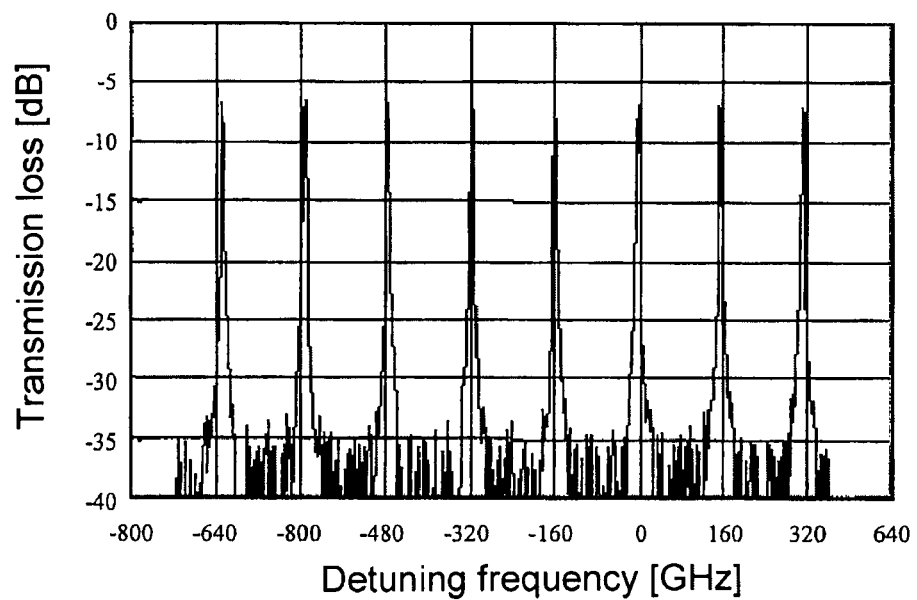
FIG. 26 is a view showing the transfer function in the frequency domain of an FP filter.

As an optical pulse train generator according to another embodiment of the present invention, a structure including a Fabry-Perot (FP) filter may be provided in order to remove the above-explained noise in the spectral domain. FIG. 26 shows an example in which a transfer function of the FP filter is indicated by the frequency domain. In this embodiment, matching each peak position of the transfer function of the FP filter shown in FIG. 26 and a repetition frequency with the beat light 21 generated by the beat light generation means 11 enables effectively removing the noise components.

The FP filter may be arranged at a position immediately after two continuous lights are combined by the 3-dB coupler 11c to produce the beat light 20 or immediately after the continuous lights are amplified by the EDFA 11c. Alternatively, the FP filter can be arranged at one or more arbitrary positions including this position.

A description will now be given as to a result of confirming from a simulation that the optical pulse train 24 generated by the optical pulse train generator according to the embodiment is an in-phase pulse train. To confirm that the optical pulse train 24 is an in-phase pulse train, a simulation that the optical pulse train 24 having a repetition frequency of 160 GHz is used to perform OTDM and a pulse train having a doubled repetition frequency, i.e., 320 GHz is thereby generated is carried out. A block diagram of FIG. 27 shows a structural example in which the optical pulse train 24 is used to perform OTDM.

Figure 27:
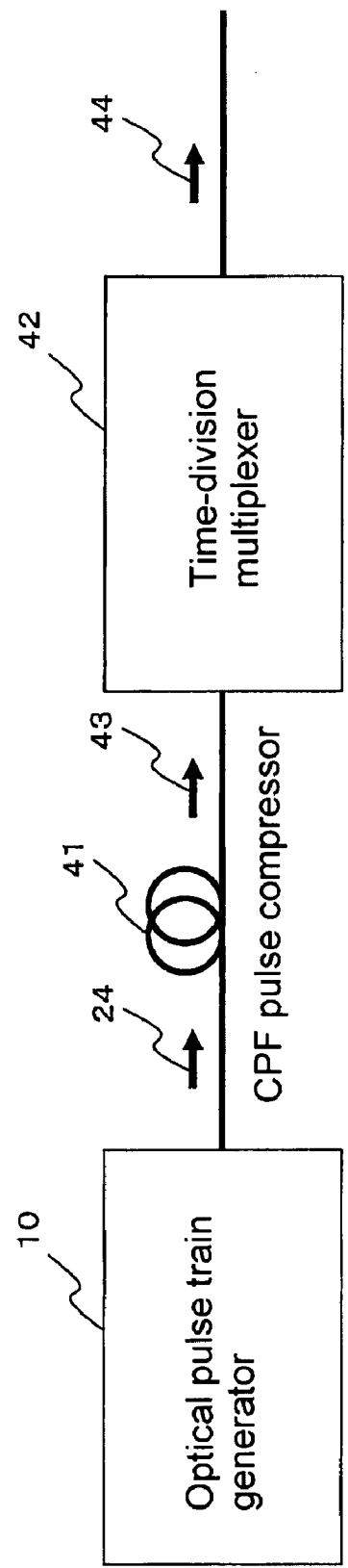
FIG. 27 is a block diagram showing a structural example for performing OTDM with respect to an optical pulse train generated by the optical pulse train generator according to the present invention.
Figure 28:
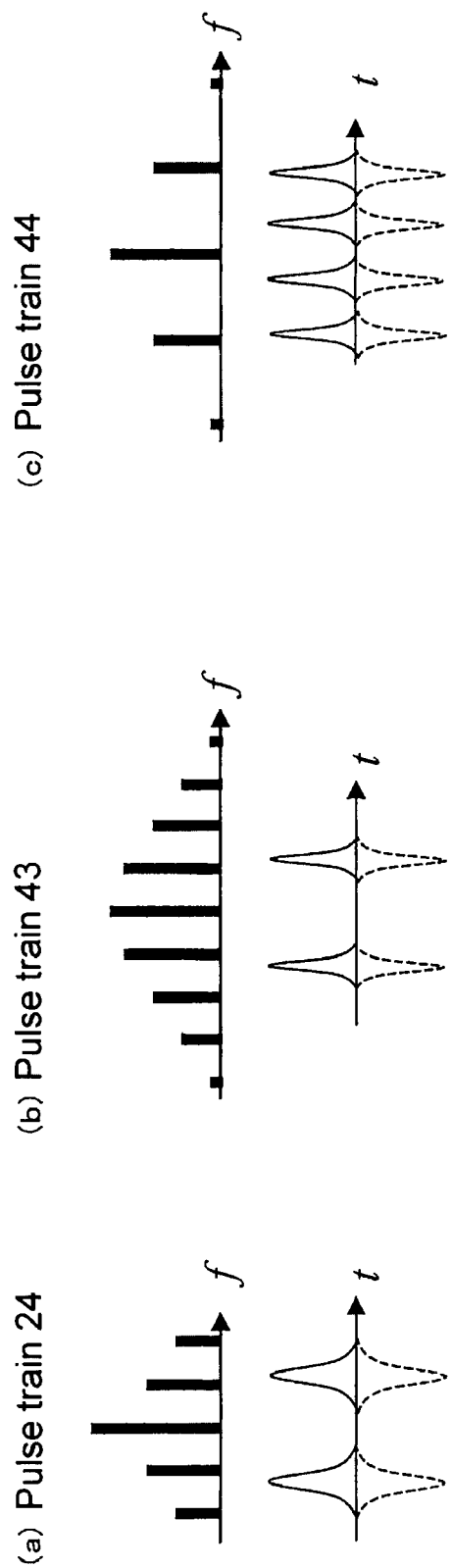
FIG. 28 is schematic views each showing a pulse waveform generated in a process of performing OTDM.

In the structural example depicted in FIG. 27, the optical pulse train 24 produced by the optical pulse train generator 10 according to the first embodiment is further compressed by a CPF pulse compressor 41 and then input to a time-division multiplexer 42. The CPF pulse compressor 41 used in this example is configured by combining highly nonlinear fibers and anomalous dispersion fibers on four stages. First, FIG. 28 schematically shows an example of a pulse waveform obtained when OTDM is carried out in the structural example depicted in FIG. 27.

When the optical pulse train 24 generated by the optical pulse train generator 10 (FIG. 28(a)) is further compressed by the CPF pulse compressor 41, the optical pulse train 24 is shaped into a pulse train 43 having such a reduced pulse width as shown in FIG. 28(b). Moreover, when the pulse train 43 is input to the time-division multiplexer 42, the pulse train 25 is first divided into two pieces, a time delay of 3.125 ps is given to one piece, and then these pieces are again combined to be output.

A pulse train 44 output from the time-division multiplexer 42 is output with a repetition frequency converted into 320 GHz as shown in FIG. 28(c). It is to be noted that the time delay of 3.125 ps corresponds to a half of an adjacent pulse time interval 6.25 ps for the repetition frequency of 160 GHz.

When the optical pulse train 24 is an in-phase pulse train (therefore, the optical pulse train 43 is also an in-phase pulse train), the optical pulse train 44 subjected to OTDM under given conditions is also in phase, and a pulse train having the same waveform is produced at a half repetition time interval as shown on a lower side of FIG. 28(c). As the condition, a central frequency f0 of the pulse train is even-fold of the repetition frequency Δf. At this time, when the waveform of the optical pulse train subjected to OTDM is seen from a frequency axis, every other spectral component is alternately vanished, and a frequency interval becomes 320 GHz that is twofold of an original frequency interval. On the other hand, if the optical pulse train 24 having the central frequency f0 is an out-of-phase pulse train, every other spectral component that should be vanished remains, and a high-quality pulse train having the repetition frequency of 320 GH cannot be obtained.

A reason that f0 must be even-fold of Δf as the condition for performing OTDM with respect to the in-phase pulse train having the central frequency f0 and the repetition frequency Δf to obtain the in-phase pulse train having the doubled repetition frequency is explained as follows. Considering the spectrum of the in-phase pulse train, the frequency f0 is determined as the center, and line spectral components are present in a frequency of f0+nΔf where n is an integer.

A time delay of ΔT/2=1/(2Δf) that is a half of a repetition time interval ΔT=1/Δf corresponding to the repetition frequency Δf is given to one of two pieces obtained by dividing the in-phase pulse train while considering performing OTDM with respect to the in-phase pulse train. Considering on the frequency axis, this time delay is equal to giving a phase shift of $2\pi(\Delta T/2)f[rad]$ to a given frequency f. That is, when the frequency is f=f0+nΔf, an amplitude of spectrums is multiplied by $\exp[i\pi(f0/\Delta f+n)]$.

On the other hand, in order for the pulse train obtained after recombination to be an in-phase pulse train, a frequency component of f0+2mΔf must remain and a component of f0+(2m−1)Δf must be eliminated, where m is an integer. In order to satisfy this condition, f0 must be even-fold of Δf, and $\exp[i\pi(f0/\Delta f+n)]=\exp[in\pi]=(-1)n$ is achieved at this moment. On the other hand, when f0 is odd-fold of Δf, since $\exp[i\pi(f0/\Delta f+n)]=\exp[i(n+1)\pi]=(-1)n+1$ is achieved, the frequency component f0+2mΔf is eliminated and the component of f0+(2m−1)Δf remains where m is an integer, whereby an out-of-phase pulse train having a repetition frequency doubled by OTDM is generated.

Figure 29:
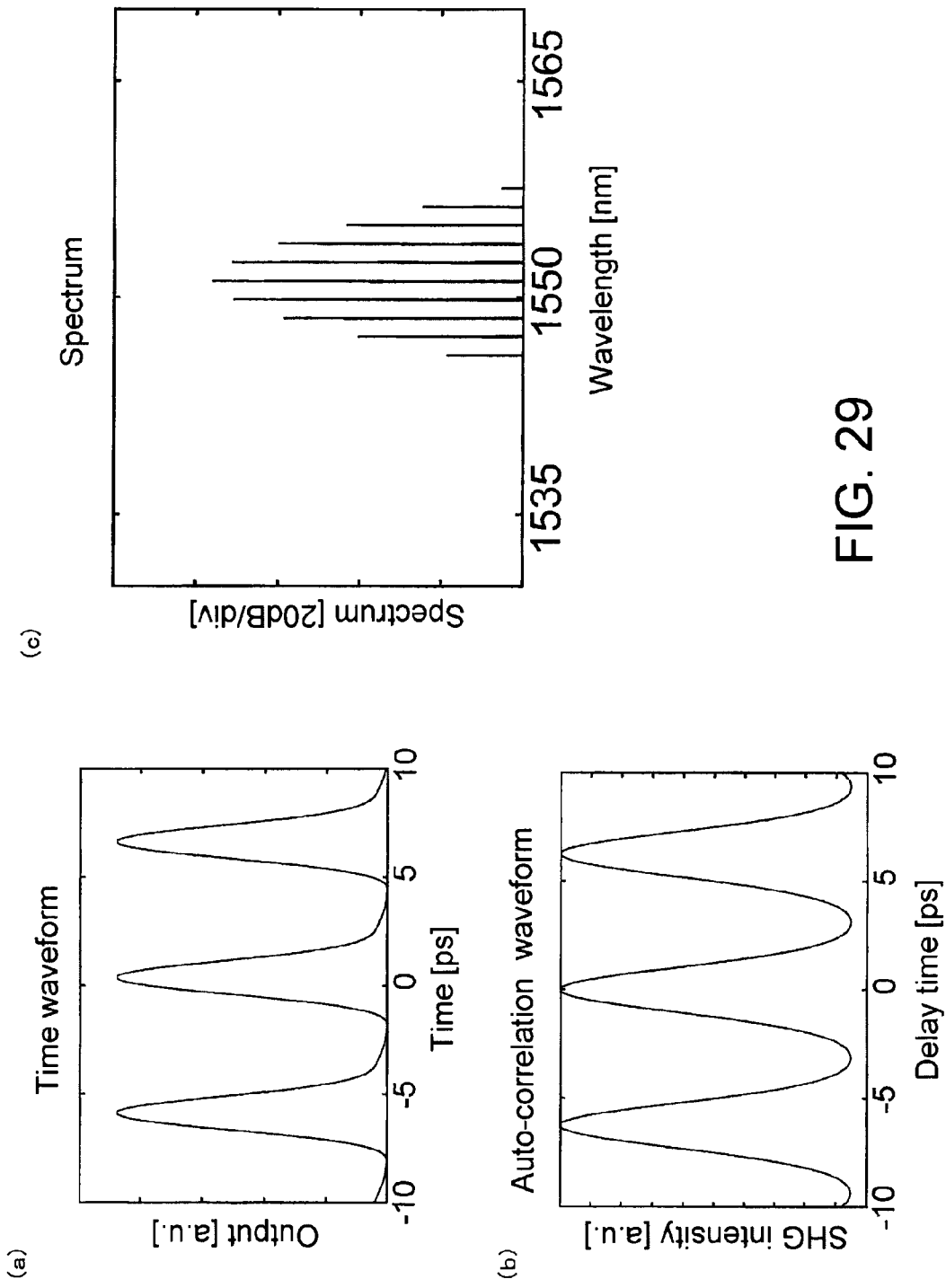
FIG. 29 is views showing a waveform of an optical pulse train generated by the optical pulse train generator according to the present invention, in which (a) shows a time waveform, (b) shows the auto-correlation waveform, and (c) shows the spectrum.

Thus, the characteristics when OTDM is carried out with respect to the in-phase pulse train are confirmed by using a simulation result and hence will be explained hereinafter. First, FIG. 29 shows a simulation result of the waveform of the optical pulse train 24 generated by the optical pulse train generator 10. In FIG. 29, (a) shows a time waveform; (b), the auto-correlation waveform; and (c), the spectrum. Here, the central frequency f0 is 193.28 THz that is 1208-fold of the repetition frequency Δf=160 GHz (which is the same as the second example).

Figure 30:
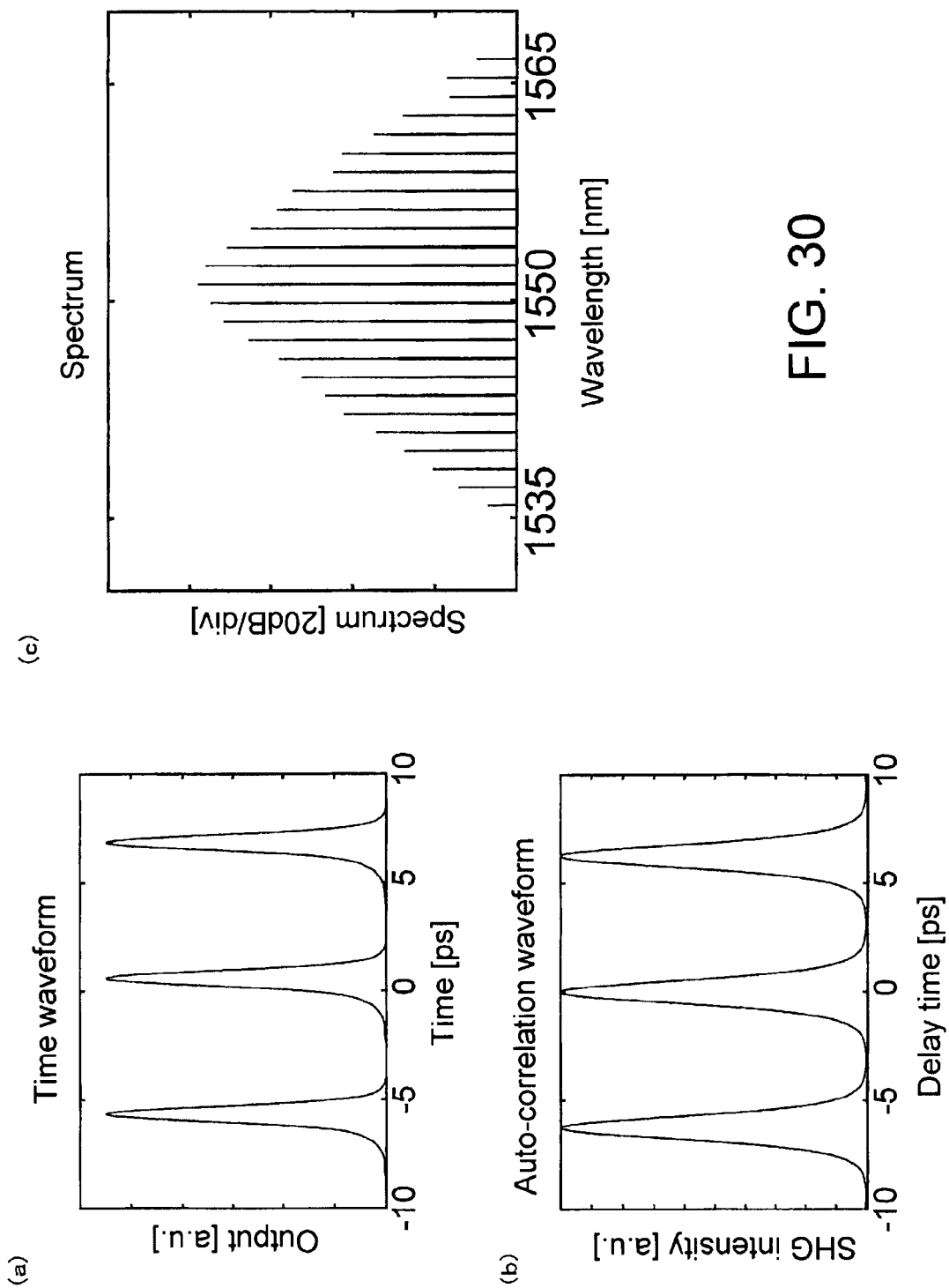
FIG. 30 is views showing a waveform of an optical pulse train compressed by a CPF pulse compressor, in which (a) shows the temporal waveform, (b) shows the auto-correlation waveform, and (c) shows the spectrum.

FIG. 30 shows a result obtained by compressing the optical pulse train 24 depicted in FIG. 29 by the CPF pulse compressor 41. It can be confirmed from FIG. 30 that the FWHM is compressed to 0.82 ps by compression in the CPF pulse compression 41 and a width of each spectrum is expanded.

Figure 31:
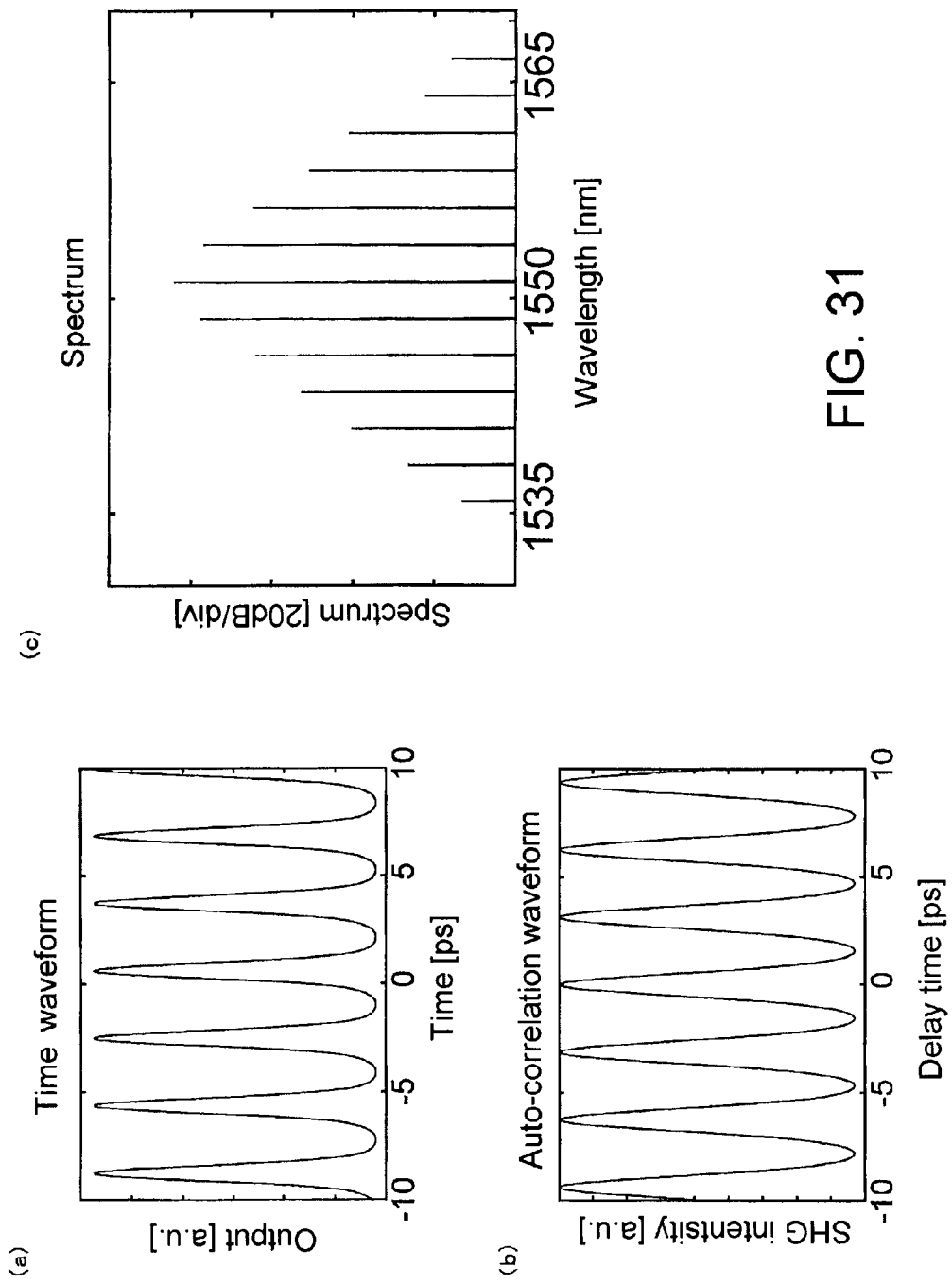
FIG. 31 is views showing a waveform of an optical pulse train subjected to OTDM by a time-division multiplexer, in which (a) shows the temporal waveform, (b) shows the autocorrelation waveform, and (c) shows the spectrum.
Figure 32:
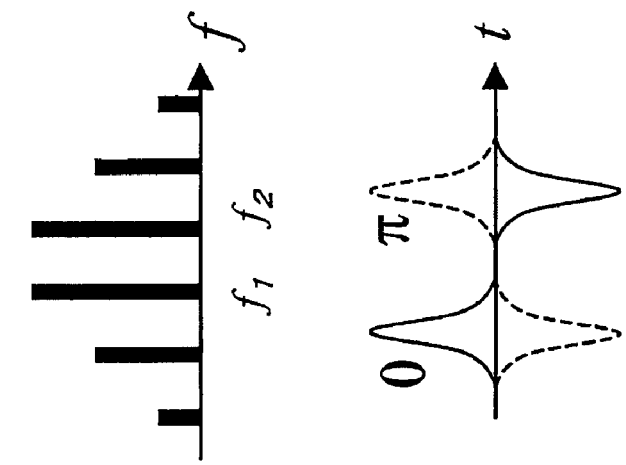
FIG. 32 is a view showing an example of an optical pulse train obtained by compressing a beat light.
Figure 32:
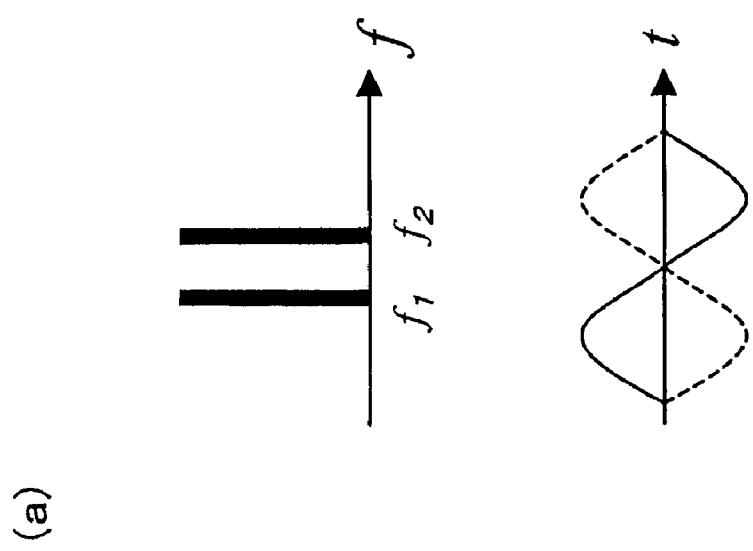

FIG. 31 shows a result obtained by carrying out OTDM with respect to the optical pulse train 43 depicted in FIG. 30 by the time-division multiplexer 42. It can be confirmed from the spectrum depicted in FIG. 31(c) that every other spectral component is vanished and the repetition frequency is doubled in the optical pulse train 44 formed based on OTDM. Furthermore, as shown in a time waveform depicted in FIG. 31(a), a pulse waveform is maintained even after OTDM, and the FWHM is unchanged from 0.82 ps.

Incidentally, when the central frequency f0 is changed to 193.12 THz (a corresponding wavelength is 1552.40265 nm) that is 1207-fold of the repetition frequency Δf=160 GHz and the same simulation is carried out, it can be confirmed that a pulse train obtained by effecting OTDM is an out-of-phase pulse train having a repetition frequency of 320 GHz.

It was confirmed from the simulation result that the optical pulse train 24 generated by the optical pulse train generator 10 is an in-phase pulse train. Since the optical pulse train 24 produced by the optical pulse train generator 10 according to this embodiment is the in-phase optical pulse train, even if the repetition frequency is doubled by OTDM, an optical pulse train to be generated is still an in-phase pulse train, and a pulse waveform is maintained. Therefore, repeating OTDM facilitates generation of an in-phase optical pulse train having an ultrahigh repetition frequency of, e.g., 1 THz or above.

As OTDM means, for example, a method using an optical time-division multiplexer in which a Mach-Zehnder interferometer that produces a predetermined delay time amount in one arm is integrated on a quartz-based planar lightwave circuit (PLC) can be considered, and enabling a stable operation and accurate control over a delay amount based on, e.g., temperature control is desirable.

Spectrum shaping means is not restricted to the BPF 13, and it may be any other means having frequency dependence transfer characteristics, e.g., a fiber Bragg grating may be adopted. Alternatively, it is possible to use means for separating each frequency component by an arrayed waveguide grating, and adding an arbitrary loss to each component, and again combining the components.

Means for generating side modes of the beat light 21 is not restricted to the FWM in the HNLF 12, and it may be any other means, e.g., an FWM using a medium that demonstrates a third-order nonlinear effect or difference frequency generation using a medium that demonstrates a second-order nonlinear effect. An anomalous dispersion medium is not restricted to the single-mode fiber 14, and a method using any other anomalous dispersion medium, e.g., a diffraction grating in a spatial system can be considered.

As explained above, according to the optical pulse train generator of the present invention, a beat light can be used as a seed light source to generate a generally extensively utilized in-phase pulse train. The optical pulse train generator according to the present invention is optimum as a signal source that performs ultrahigh-speed transmission in an optical transmission path configured for the purpose of transmission of an RZ pulse signal.

Although means for performing intensity modulation with respect to a generated ultrahigh repetition in-phase optical pulse train is required in order to apply the optical pulse train generator according to the present invention to ultrahigh-speed optical transmission, a method for superimposing a signal obtained by effecting OTDM to a signal having a low bit rate on its optical pulse train to enter an optical fiber and carrying out an ultrahigh-speed AND gate operation based on an effect of, e.g., cross-phase modulation can be considered, for example.

As another application of the optical pulse train generator according to the present invention, the optical pulse train generator can be used for a clock pulse train for various kinds of signal processing, e.g., optical phase-locked loop or optical sampling.

It is to be noted that the description in this embodiment exemplifies the optical pulse train generator according to the present invention, and the present invention is not restricted thereto. Detailed structures, detailed operations, and others of the optical pulse train generator according to this embodiment can be appropriately changed without departing from the scope of the present invention.

The invention claimed is:

1. An optical pulse train generator comprising:
    beat light generation means for combining two continuous lights having a frequency difference corresponding to a predetermined repetition frequency to generate a beat light having the predetermined repetition frequency;
    side mode generation means for generating a side mode with respect to the beat light based on a nonlinear effect; and
    spectrum shaping means for adjusting a power ratio of the side mode generated by the side mode generation means and the beat light,
    wherein an in-phase pulse train is generated.

2. The optical pulse train generator according to claim 1, wherein the beat light generation means generates an unbalanced beat light by providing a difference between powers of the two continuous lights and combining the continuous lights.

3. The optical pulse train generator according to claim 1, wherein a ratio of amplitudes of the two continuous lights is set to fall within the range of 0.82 to 0.88.

4. The optical pulse train generator according to claim 1, wherein the beat light generation means includes:
   two laser oscillators that output laser beams having a frequency difference corresponding to the repetition frequency;
   a 3-dB coupler that combines the two laser beams to output the beat light;
   a first optical amplifier that amplifies the beat light; and
   a first band pass filter that suppresses ASE (Amplified Spontaneous Emission) noise generated in the first optical amplifier.

5. The optical pulse train generator according to claim 1, wherein the side mode generation means is a four-wave mixing in an optical fiber.

6. The optical pulse train generator according to claim 5, wherein the optical fiber is a highly nonlinear fiber.

7. The optical pulse train generator according to claim 5, wherein two or more fibers are connected with each other in the optical fiber and an isolator is interposed between the fibers connected with each other.

8. The optical pulse train generator according to claim 1, wherein the spectrum shaping means is a second band pass filter.

9. The optical pulse train generator according to claim 8, wherein the second band pass filter has a central frequency that is different from a central frequency of an input optical pulse train by a predetermined width.

10. The optical pulse train generator according to claim 1, further comprising an anomalous dispersion medium on an outlet side of a band pass filter, the anomalous dispersion medium performing chirp compensation with respect to the optical pulse train having the shaped frequency spectrum.

11. The optical pulse train generator according to claim 10, wherein the anomalous dispersion medium is a single-mode fiber.

12. The optical pulse train generator according to claim 10, further comprising an optical pulse compressor on an outlet side of the anomalous dispersion medium.

13. The optical pulse train generator according to claim 12, wherein the optical pulse compressor is configured by alternately connecting a nonlinear medium and the anomalous dispersion medium.

14. The optical pulse train generator according to claim 13, further comprising an isolator at any one or more positions between the nonlinear medium and the anomalous dispersion medium.

15. The optical pulse train generator according to claim 12, comprising a second optical amplifier and a third band pass filter between the anomalous dispersion medium and the optical pulse compressor.

16. The optical pulse train generator according to claim 4, comprising a filter that allows line spectral components alone of the optical pulse train to be transmitted therethrough at any one or more positions on an outlet side of the 3-dB coupler or/and a downstream side of the 3-dB coupler.

17. The optical pulse train generator according to claim 16, wherein the filter is a Fabry-Perot filter.

18. The optical pulse train generator according to claim 10, further comprising optical time-division multiplexers whose quantity is determined based on the repetition frequency of the beat light and a required repetition frequency on the outlet side of the anomalous dispersion medium.

19. The optical pulse train generator according to claim 18, wherein the optical pulse compressor is further provided between the anomalous dispersion medium and the optical time-division multiplexers.

20. The optical pulse train generator according to claim 1, wherein a central frequency of the pulse train is even-fold of the repetition frequency.

* * * * *